United States Patent
Kamada et al.

(10) Patent No.: US 12,462,571 B2
(45) Date of Patent: Nov. 4, 2025

(54) DATA EXTRACTION DEVICE, DATA EXTRACTION METHOD, AND DATA TRANSMISSION DEVICE FOR EXTRACTING IMAGES FOR TRANSMISSION NOT INCLUDING AN OBSTRUCTION

(71) Applicant: Mitsubishi Electric Corporation, Tokyo (JP)

(72) Inventors: Kohei Kamada, Tokyo (JP); Hideki Fukuhara, Tokyo (JP); Masahiro Nakatsukasa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 117 days.

(21) Appl. No.: 18/279,291

(22) PCT Filed: Apr. 12, 2021

(86) PCT No.: PCT/JP2021/015141
§ 371 (c)(1),
(2) Date: Aug. 29, 2023

(87) PCT Pub. No.: WO2022/219671
PCT Pub. Date: Oct. 20, 2022

(65) Prior Publication Data
US 2024/0135717 A1  Apr. 25, 2024
US 2024/0233388 A9  Jul. 11, 2024

(51) Int. Cl.
*G06V 20/56* (2022.01)
*G06V 10/25* (2022.01)
*G06V 10/74* (2022.01)

(52) U.S. Cl.
CPC .............. *G06V 20/56* (2022.01); *G06V 10/25* (2022.01); *G06V 10/761* (2022.01)

(58) Field of Classification Search
None
See application file for complete search history.

(56) References Cited

U.S. PATENT DOCUMENTS

| 2007/0140527 A1* | 6/2007 | Yamamoto | G06V 20/58 |
| | | | 382/104 |
| 2014/0132707 A1* | 5/2014 | Hashimoto | H04N 13/239 |
| | | | 348/36 |

(Continued)

FOREIGN PATENT DOCUMENTS

| JP | 2020-38362 A | 3/2020 |
| JP | 2020-80462 A | 5/2020 |

OTHER PUBLICATIONS

International Search Report, issued in PCT/JP2021/015141, PCT/ISA/210, dated Jun. 29, 2021.

(Continued)

*Primary Examiner* — Frank Johnson
(74) *Attorney, Agent, or Firm* — Birch, Stewart, Kolasch & Birch, LLP

(57) ABSTRACT

A data extraction device, which extracts an image for transmission from images obtained by capturing surroundings outside a vehicle with an imaging device mounted on the vehicle each time the vehicle travels an extraction distance, includes: processing circuitry configured to acquire an image obtained by capturing the surroundings outside the vehicle; determine, as an object to be analyzed, an image captured at a position advanced by the extraction distance from a position at which a previously extracted image has been captured, and calculate an obstruction distance which indicates an actual distance from an imaging start position of the image having been determined as the object to be analyzed to a position of an obstruction included in the determined image; output the calculated obstruction dis- (Continued)

tance as a next extraction distance; and extract the image that has been determined as the object to be analyzed.

8 Claims, 18 Drawing Sheets

(56) References Cited

U.S. PATENT DOCUMENTS

| | | | |
|---|---|---|---|
| 2018/0173237 A1* | 6/2018 | Reiley | B60Q 1/5035 |
| 2018/0210451 A1* | 7/2018 | Naik | G05D 1/0246 |
| 2018/0321030 A1* | 11/2018 | Kido | G06V 20/56 |
| 2020/0005635 A1* | 1/2020 | Nagata | G01S 19/49 |
| 2020/0318989 A1* | 10/2020 | Yang | G01C 21/3667 |
| 2021/0180981 A1* | 6/2021 | Matsumoto | G06V 20/56 |
| 2024/0312343 A1* | 9/2024 | Ali | G08G 1/096725 |

OTHER PUBLICATIONS

Japanese Office Action for Japanese Application No. 2023-514183, dated Apr. 2, 2024, with English translation.

\* cited by examiner

DATA EXTRACTION DEVICE, DATA EXTRACTION METHOD, AND DATA TRANSMISSION DEVICE FOR EXTRACTING IMAGES FOR TRANSMISSION NOT INCLUDING AN OBSTRUCTION

TECHNICAL FIELD

The present disclosure relates to a data extraction device that extracts information for transmission from information acquired by a device mounted on a vehicle.

BACKGROUND ART

In recent years, a device mounted on a vehicle and an external server or the like have often communicated with each other, so that the communication volume has been increased. On the other hand, there is a technique of reducing the communication volume.

For example, Patent Literature 1 discloses an image management device that, in a technology of outputting an image obtained by imaging surroundings outside a mobile object to an external server, determines and stores some images among a plurality of images obtained by imaging the surroundings outside the mobile object depending on the speed of the mobile object.

Specifically, the image management device disclosed in Patent Literature 1 determines, as a condition for determining an image to be stored, at least one of a condition regarding a time interval until a next image to be stored is determined after one image has been determined as an image to be stored and a condition regarding a distance traveled by the mobile object until the next image to be stored is determined after one image has been determined as an image to be stored, on the basis of the speed of the mobile object.

CITATION LIST

Patent Literature

Patent Literature 1: JP 2020-80462 A

SUMMARY OF INVENTION

Technical Problem

However, the image management device disclosed in Patent Literature 1 has a problem that an image captured at each time interval or distance based on the speed of the mobile object is simply stored, and thus the image may include an obstruction. Then, in a case where information in a situation without having an obstruction is necessary, the image management device disclosed in Patent Literature 1 cannot transmit necessary information.

The present disclosure has been made to solve the above problems, and an object of the present disclosure is to provide a data extraction device capable of reducing a communication volume and extracting information in a situation where an obstruction is not present from acquired information.

Solution to Problem

The data extraction device according to the present disclosure is a data extraction device that extracts an image for transmission from images obtained by capturing surroundings outside a vehicle with an imaging device mounted on the vehicle, each time the vehicle travels an extraction distance, the data extraction device including: processing circuitry configured to acquire an image obtained by capturing the surroundings outside the vehicle; determine, as an object to be analyzed, an image captured at a position advanced by the extraction distance from a position at which a previously extracted image has been captured, and calculate an obstruction distance which indicates an actual distance from an imaging start position of the image having been determined as the object to be analyzed to a position of an obstruction included in the determined image; output the calculated obstruction distance as a next extraction distance; and extract the image that has been determined as the object to be analyzed.

Advantageous Effects of Invention

With the above configuration, the present disclosure can provide a data extraction device capable of reducing a communication volume and extracting information in a situation where an obstruction is not present from acquired information.

DESCRIPTION OF EMBODIMENTS

In order to describe the present disclosure in more detail, a mode for carrying out the present disclosure will now be described with reference to the accompanying drawings.

First Embodiment

Figure 1:
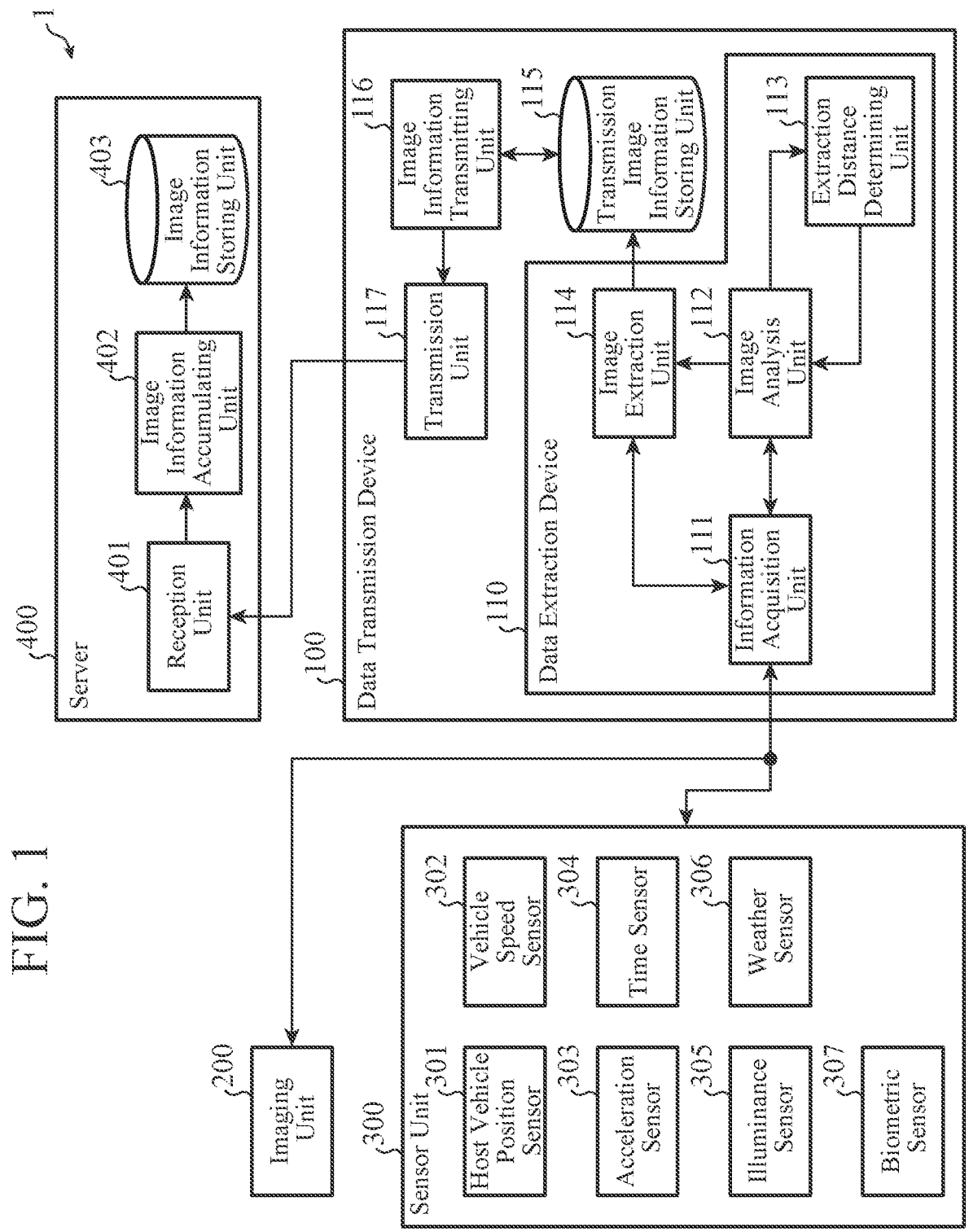
FIG. 1 is a diagram illustrating a configuration of a data extraction device, a data transmission device, and a data transfer system including the data extraction device and the data transmission device according to a first embodiment.

FIG. 1 is a diagram illustrating a configuration of a data extraction device, a data transmission device, and a data transfer system including the data extraction device and the data transmission device according to the first embodiment.

A data transfer system 1 is a system that acquires information and transfers the acquired information to the outside. The data transfer system 1 is, for example, a system that acquires images from an imaging device mounted on a vehicle, extracts an image for transmission from the acquired images, and transfers the extracted image to an external server 400.

The data transfer system 1 includes, for example, a data transmission device 100, an imaging unit 200, a sensor unit 300, and the server 400.

The data transmission device 100 transmits, to the external server, an image extracted each time the vehicle travels an extraction distance from among images of surroundings outside of the vehicle captured by the imaging unit 200 mounted on the vehicle.

The data transmission device 100 is communicatively connected to the imaging unit 200, the sensor unit 300, and the server 400.

The data transmission device 100 acquires an image from the imaging unit 200 in a predetermined time unit, and acquires information regarding the vehicle and the periphery of the vehicle from the sensor unit 300 at each time the image has been captured by the imaging unit 200.

The data transmission device 100 extracts an image for transmission from the plurality of acquired images and transmits the image.

Details of the data transmission device 100 will be described later.

The imaging unit 200 includes an imaging device such as a camera, and is mounted on the vehicle.

The imaging unit 200 captures an image of the surroundings outside the vehicle from the vehicle in a predetermined time unit, and outputs the captured image.

The image captured by the imaging unit 200 includes, for example, a road and the periphery of the road, and is used for analyzing the state of the road and equipment on the periphery of the road. For example, the server 400 that has received this image can diagnose the state of the road and equipment on the periphery of the road using the image.

The sensor unit 300 is mounted on the vehicle and includes a plurality of sensors that outputs measurement information indicating a result of measurement regarding the vehicle.

The plurality of sensors outputs at least measurement information indicating a result of measurement at the timing of imaging by the imaging unit 200.

The plurality of sensors includes a host vehicle position sensor 301, a vehicle speed sensor 302, an acceleration sensor 303, a time sensor 304, an illuminance sensor 305, a weather sensor 306, and a biometric sensor 307.

The host vehicle position sensor 301 outputs measurement information indicating the position of the host vehicle.

The vehicle speed sensor 302 outputs measurement information indicating the speed of the host vehicle.

The acceleration sensor 303 outputs measurement information indicating the acceleration of the host vehicle.

The time sensor 304 outputs measurement information indicating time measured by a clock (not illustrated).

The illuminance sensor 305 outputs measurement information indicating illuminance.

The weather sensor 306 outputs measurement information indicating weather at the position of the host vehicle.

The biometric sensor 307 outputs measurement information indicating biometric information relating to an occupant of the host vehicle.

The data transmission device 100 includes a data extraction device 110, a transmission image information storing unit 115, an image information transmitting unit 116, and a transmission unit 117.

The data extraction device 110 acquires an image captured by the imaging unit 200, acquires measurement information output by the sensor unit 300, and extracts an image for transmission and measurement information from the acquired image and measurement information.

For example, the data extraction device 110 extracts an image for transmission each time the vehicle travels the extraction distance from among images of surroundings outside the vehicle captured by the imaging unit 200 mounted on the vehicle.

The extraction distance indicates a distance traveled by the vehicle from the last extraction of image and measurement information to the next extraction of image and measurement information.

The data extraction device 110 includes an information acquisition unit 111, an image analysis unit 112, an extraction distance determining unit 113, and an image extraction unit 114.

The information acquisition unit 111 acquires an image obtained by capturing the surroundings outside the vehicle and measurement information at the time of imaging.

Specifically, the information acquisition unit 111 acquires an image from the imaging unit 200 and acquires measurement information indicating a measurement result from the sensor unit 300. Hereinafter, the image and the measurement information acquired by the information acquisition unit 111 are also simply described as "information" in a case where it is not particularly necessary to distinguish them from each other.

The information acquisition unit 111 stores the acquired information. The information acquisition unit 111 accumulates a plurality of pieces of information at every acquisition of information at least during a period from the previous extraction of information by the image extraction unit 114 to the next extraction of information.

At this time, at every acquisition of information, the information acquisition unit 111 calculates a travel distance from a position of the vehicle at a point of time when the previously extracted information has been acquired using the acquired information.

The information acquisition unit 111 accumulates the image, the information indicating the measurement result, and the travel distance in association with each other.

Note that, when the image extraction unit 114 extracts information, the information acquisition unit 111 may discard the information accumulated between the previous extraction processing and the current extraction processing, and then accumulate the information for the next extraction processing.

When the vehicle travels the extraction distance, the image analysis unit 112 determines information of an object to be analyzed and carries out an analysis of the information of the object having been determined to be analyzed.

Specifically, the image analysis unit 112 determines an image captured at a position advanced by the extraction distance from a position where the previously extracted image has been captured as the object for analysis, and calculates an obstruction distance indicating an actual distance from a position (hereinafter also referred to as an imaging start position) closest to the imaging device in the image determined as the object for analysis to an obstruction included in the image.

The image analysis unit 112 holds, for example, correlation information of actual distances according to the lengths in the longitudinal direction and the lateral direction in the image, and can calculate the actual distance by analyzing the image.

The extraction distance used by the image analysis unit 112 is the next extraction distance received from the extraction distance determining unit 113.

When receiving the extraction distance from the extraction distance determining unit 113, the image analysis unit 112 gives, to the image extraction unit 114, a notification indicating that the information of the object having been determined to be analyzed is a transmission candidate.

Note that, before receiving the extraction distance from the extraction distance determining unit 113, the image analysis unit 112 may determine the image first acquired by the information acquisition unit 111 as the object for analysis.

The extraction distance determining unit 113 outputs the obstruction distance or a first distance as the next extraction distance.

Specifically, the extraction distance determining unit 113 acquires the obstruction distance from the image analysis unit 112. The extraction distance determining unit 113 compares the obstruction distance with a predetermined first distance. The extraction distance determining unit 113 outputs the obstruction distance as the next extraction distance when determining that the obstruction distance is less than the first distance, and outputs the first distance as the next extraction distance when determining that the obstruction distance is equal to or greater than the first distance.

The first distance is a threshold indicating a distance in the image within which analysis using the image is possible, for example, on the basis of the resolution or the like.

The image extraction unit 114 outputs the image determined as the object for analysis by the image analysis unit 112.

Specifically, when being notified of the information as the transmission candidate and the extraction distance from the image analysis unit 112, the image extraction unit 114 extracts information from the information acquisition unit 111 using the notified information. The image extraction unit 114 stores the extracted information in the transmission image information storing unit 115.

The transmission image information storing unit 115 stores the information extracted by the image extraction unit 114 as a transmission candidate.

The image information transmitting unit 116 acquires the information from the transmission image information storing unit 115, and transmits the acquired information to the transmission unit 117.

When receiving the information from the image information transmitting unit 116, the transmission unit 117 transmits the information.

Note that an example in which the data extraction device 110 includes the information acquisition unit 111, the image analysis unit 112, the extraction distance determining unit 113, and the image extraction unit 114 will be described, but the data extraction device may further include at least any one or all of the transmission image information storing unit 115, the image information transmitting unit 116, and the transmission unit 117 of the data transmission device 100.

The server 400 has, for example, a function of diagnosing roads and structures using images.

The server 400 includes a reception unit 401, an image information accumulating unit 402, and an image information storing unit 403.

Note that the server 400 is not limited to the above example as long as it performs processing such as analysis using the image transmitted by the data transmission device 100.

A hardware configuration of the data transmission device 100 will be described.

Figure 2A:
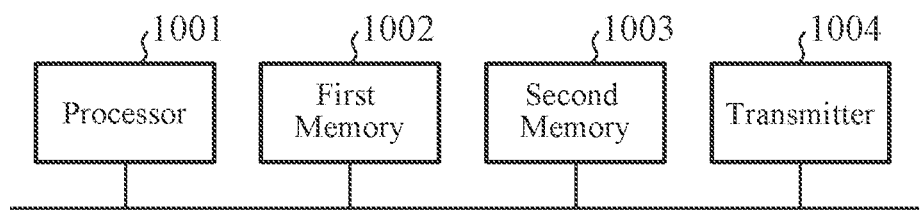
FIGS. 2A and 2B are diagrams illustrating a hardware configuration of the data transmission device.
Figure 2B:
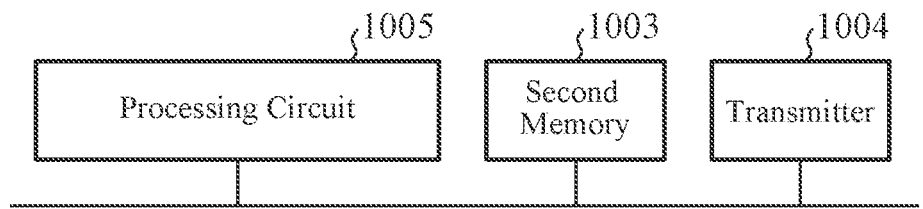

FIGS. 2A and 2B are diagrams illustrating a hardware configuration of the data transmission device 100.

As illustrated in FIG. 2A, the data transmission device 100 includes a processor 1001, a first memory 1002, a second memory 1003, and a transmitter 1004.

The processor 1001, the first memory 1002, and the second memory 1003 are mounted on a computer, for example.

The first memory 1002 stores a program for causing the computer to function as the data extraction device 110, the image information transmitting unit 116, and a control unit (not illustrated). The functions of the data extraction device 110, the image information transmitting unit 116, and the control unit (not illustrated) are implemented by the processor 1001 reading and executing the program stored in the first memory 1002.

The second memory 1003 implements the transmission image information storing unit 115.

The transmitter 1004 implements the image information transmitting unit 116 and the transmission unit 117.

The processor 1001 uses, for example, a central processing unit (CPU), a graphics processing unit (GPU), a microprocessor, a microcontroller, or a digital signal processor (DSP).

The first memory 1002 and the second memory 1003 are, for example, a nonvolatile or volatile semiconductor memory such as random access memory (RAM), read only memory (ROM), flash memory, erasable programmable ROM (EPROM), or electrically erasable programmable read only memory (EEPROM), a magnetic disk such as a hard disk or a flexible disk, an optical disk such as a compact disc (CD) or a digital versatile disc (DVD), or a magnetic optical disk.

Alternatively, the functions of the data extraction device 110, the image information transmitting unit 116, and the control unit (not illustrated) may be implemented by a dedicated processing circuit 1005 as illustrated in FIG. 2B.

The processing circuit 1005 is, for example, a single circuit, a composite circuit, a programmed processor, a parallel programmed processor, an application specific integrated circuit (ASIC), a programmable logic device (PLD), a field-programmable gate array (FPGA), a system-on-a-chip (SoC), or a system large-scale integration (LSI).

Note that the functions of the data extraction device 110, the image information transmitting unit 116, and the control unit (not illustrated) may be implemented by different processing circuits, or may be collectively implemented by a processing circuit.

Alternatively, some of the functions of the data extraction device 110, the image information transmitting unit 116, and the control unit (not illustrated) may be implemented by the processor 1001 and the first memory 1002, and the remaining functions may be implemented by the processing circuit 1005.

Figure 3:
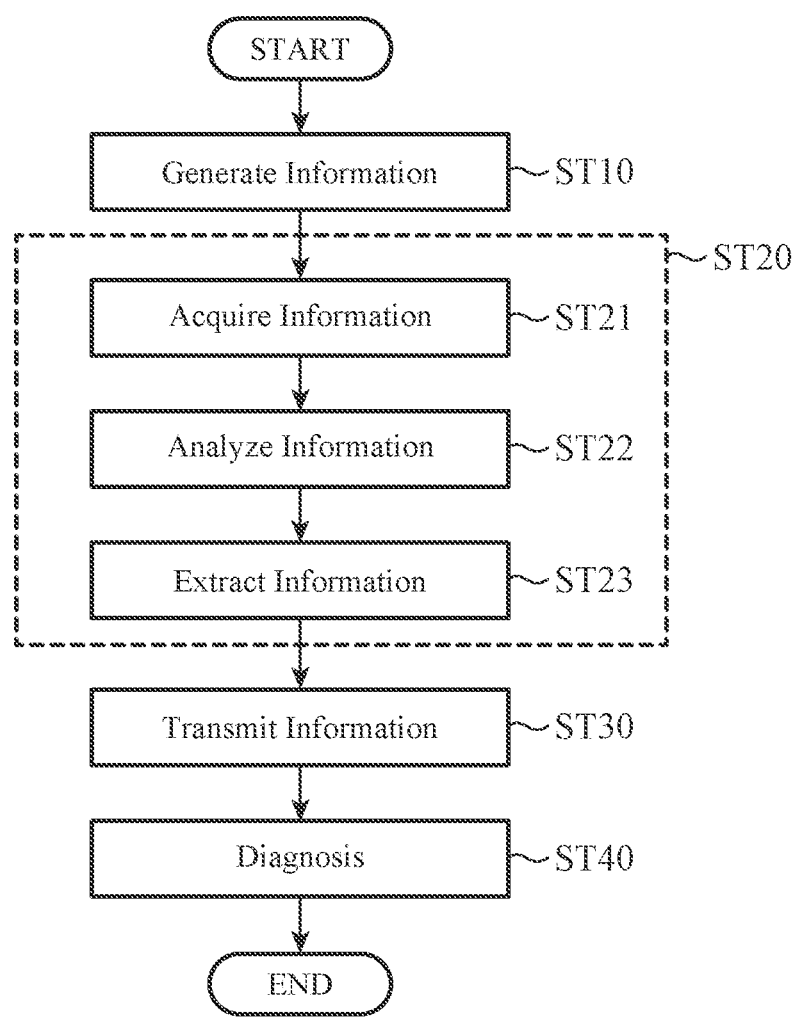
FIG. 3 is a flowchart illustrating processing performed by the data transfer system including the data extraction device and the data transmission device according to the first embodiment.

FIG. 3 is a flowchart illustrating processing performed by the data transfer system 1 including the data extraction device 110 and the data transmission device 100 according to the first embodiment.

In the data transfer system 1, each of the imaging unit 200 and the sensor unit 300 generates information (step ST10).

Specifically, the imaging unit 200 captures an image of surroundings outside the vehicle from the vehicle, and outputs the captured image. In addition, the sensor unit 300 outputs information indicating a measurement result of each sensor.

The sensor unit 300 outputs, for example, position information indicating a position, imaging time, and vehicle speed information at the time of imaging by the imaging unit 200.

When the imaging unit 200 and the sensor unit 300 output information, the processing proceeds to step ST20.

Step ST20 is processing performed by the data extraction device 110.

In step ST20, the data extraction device 110 acquires information by the information acquisition unit 111 (step ST21).

In the data extraction device 110, the image analysis unit 112 analyzes the information in cooperation with the extraction distance determining unit 113 (step ST22).

The image extraction unit 114 receives an analysis result from the image analysis unit 112. The image extraction unit 114 extracts information from the information acquisition unit 111 using the analysis result (step ST23), and stores the extracted information in the transmission image information storing unit 115.

When the transmission image information storing unit 115 stores the information, the image information transmitting unit 116 acquires the information from the transmission image information storing unit 115 and transmits the information to the transmission unit 117.

When receiving the information from the image information transmitting unit 116, the transmission unit 117 transmits the information (step ST30).

When information is transmitted from the data transmission device 100, the reception unit 401 in the server 400 receives the information, the image information accumulating unit 402 and the image information storing unit 403 store the received information, and a diagnosis processing unit (not illustrated) executes diagnosis using the information (step ST40).

Figure 4:
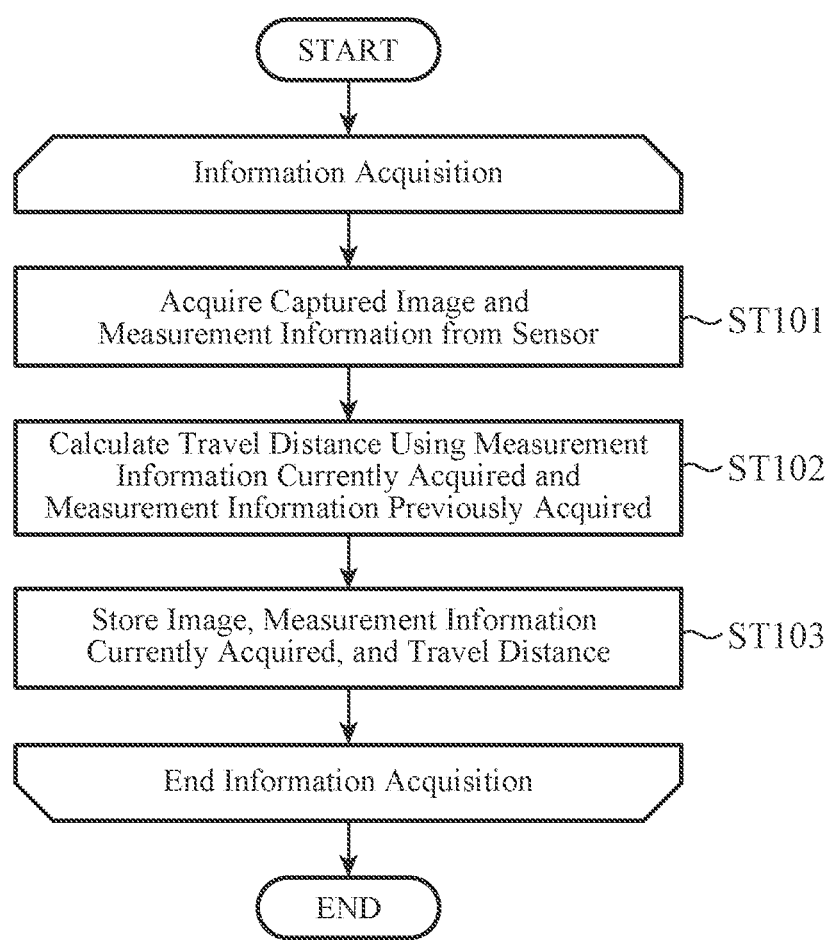
FIG. 4 is a flowchart illustrating information acquisition processing in FIG. 3.

FIG. 4 is a flowchart illustrating the information acquisition processing in FIG. 3.

When starting the repetitive processing of acquiring information, the information acquisition unit 111 acquires an image captured by the imaging unit 200 and measurement information indicating a measurement result by the sensor (step ST101).

Specifically, the information acquisition unit 111 acquires one of the measurement information indicating the position of the host vehicle, the measurement information indicating the speed of the host vehicle, the measurement information indicating time, and the measurement information indicating the acceleration of the host vehicle.

The information acquisition unit 111 calculates the travel distance using the information (the image and the measurement information indicating the measurement result) at the previous extraction timing of information and the information currently acquired (step ST102).

The information acquisition unit 111 stores the image, the measurement information indicating the current measurement result, and the travel distance (step ST103).

For example, the information acquisition unit 11*l* repeats the processing until receiving a command to end the information acquisition.

Figure 5:
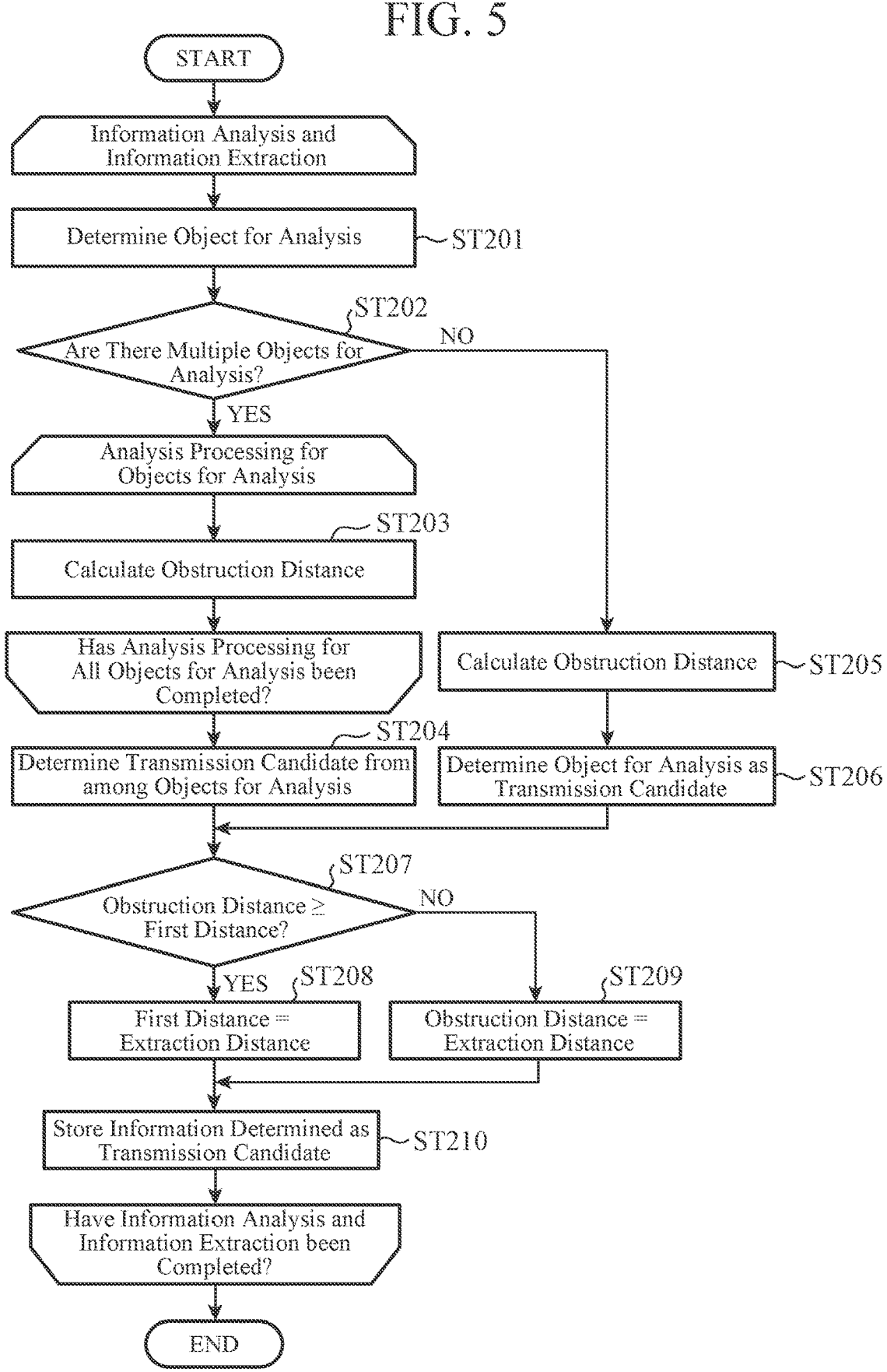
FIG. 5 is a flowchart illustrating information analysis processing and information extraction processing in FIG. 3.

FIG. 5 is a flowchart illustrating information analysis processing and information extraction processing in FIG. 3.

For example, w % ben receiving an instruction to start the information analysis processing and the information extraction processing, the data extraction device 110 starts the processing.

The image analysis unit 112 determines information which is to be analyzed (step ST201).

Specifically, for example, the image analysis unit 112 stores information indicating a previous transmission image to the server 400, and checks the travel distance from the point where the previous transmission image has been captured in the order of acquisition (imaging order) with respect to the information acquired by the information acquisition unit 111.

The image analysis unit 112 acquires a captured image in which the travel distance from the point where the previous transmission image has been captured does not exceed the extraction distance in the previous transmission image and is closest to the extraction distance, and sets the captured image as the object for analysis.

The image analysis unit 112 determines whether or not there is a plurality of pieces of information to be analyzed (step ST202).

Specifically, for example, in a case where there is a plurality of corresponding captured images due to, for example, stop of the host vehicle, the image analysis unit 112 acquires the plurality of captured images, and in a case where the captured images are determined to be objects for analysis, the image analysis unit 112 determines that there is information to be analyzed.

When determining that there is a plurality of objects for analysis ("YES" in step ST202), the image analysis unit 112 sequentially repeats the analysis processing on the plurality of objects for analysis.

The image analysis unit 112 calculates an obstruction distance (step ST203).

When the analysis processing for all the objects for analysis is completed, the repetitive processing ends.

Transmission candidates are determined from the information of the object having been determined to be analyzed on the basis of the obstruction distances in all the objects for analysis (step ST204).

Specifically, for example, the image analysis unit 112 compares the obstruction distances in the images and determines an image having the largest obstruction distance as the transmission candidate image. In the following description, the obstruction distance in the image determined as the transmission candidate is used as the obstruction distance used in the subsequent processing.

When determining that a plurality of objects for analysis is not present ("NO" in step ST202), the image analysis unit 112 calculates the obstruction distance (step ST205).

Specifically, for example, when there is only one captured image determined as the object for analysis, the image analysis unit 112 calculates the obstruction distance from the imaging start point to the nearest obstruction in the captured image by image recognition.

The obstruction can be recognized using an existing function of recognizing vehicles, pedestrians, and the like.

The obstruction distance can be calculated by holding correlation information between the longitudinal and lateral lengths of the image and the actual distance in advance and using the correlation. In addition, the obstruction distance can also be calculated using information from a distance measurement device such as LiDAR in combination. Alternatively, a method using another known technique may be used.

Then, the image analysis unit 112 determines the information of the object having been determined to be analyzed as the transmission candidate information (step ST206).

The image analysis unit 112 notifies the extraction distance determining unit 113 of the calculated obstruction distance in the transmission candidate image.

The extraction distance determining unit 113 determines whether or not the obstruction distance is greater than or equal to the first distance (step ST207).

When determining that the obstruction distance is greater than or equal to the first distance ("YES" in step ST207), the extraction distance determining unit 113 determines the first distance as the next extraction distance (step ST208).

When determining that the obstruction distance is not greater than or equal to the first distance ("NO" in step ST207), the extraction distance determining unit 113 determines the obstruction distance as the next extraction distance (step ST209).

The extraction distance determining unit 113 notifies the image analysis unit 112 of the determined extraction distance.

The image analysis unit 112 notifies the image extraction unit 114 of the transmission candidate information and the extraction distance.

Upon receiving the notification from the image analysis unit 112, the image extraction unit 114 extracts information from the information acquisition unit 111 on the basis of the transmission candidate information and the extraction distance, and stores the extracted information in the transmission image information storing unit 115 (step ST210).

At this time, the image extraction unit 114 may extract only a region up to a position advanced by the extraction distance from the imaging start point and store the extracted region as the transmission candidate information. As a result, only a minimum image is transmitted, so that the communication volume can be reduced.

In addition, information acquired from the sensor unit 300 at the time of capturing the transmission candidate image may also be acquired from the information acquisition unit 111 and stored in addition to the transmission candidate information.

The data extraction device 110 repeats the information analysis and the information extraction until a command to end the information analysis and the information extraction is issued.

Figure 6:
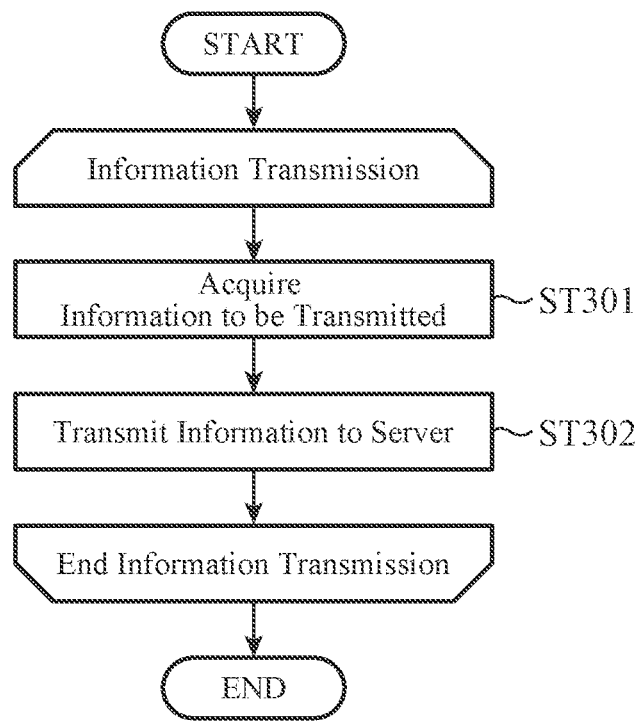
FIG. 6 is a flowchart illustrating information transmission processing in FIG. 3.

FIG. 6 is a flowchart illustrating information transmission processing in FIG. 3.

When information is stored in the transmission image information storing unit 115, the image information transmitting unit 116 in the data transmission device 100 acquires the information (step ST301).

The image information transmitting unit 116 transmits the information to the transmission unit 117.

The transmission unit 117 transmits the information to the server 400 (step ST302).

The image information transmitting unit 116 and the transmission unit 117 end the repetitive processing when there is no more information for transmission in the transmission image information storing unit 115.

Figure 7:
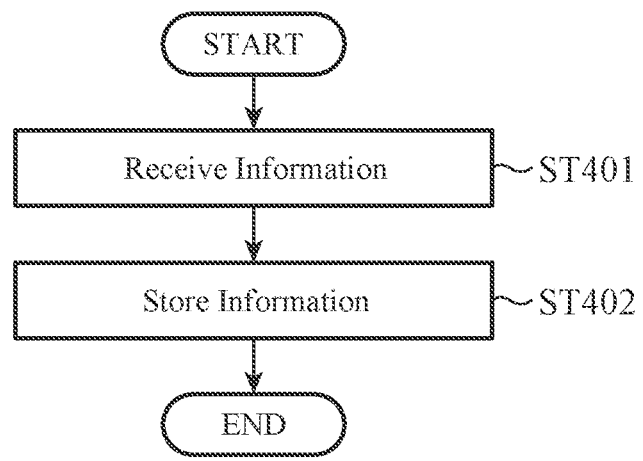
FIG. 7 is a flowchart illustrating processing of receiving information transmitted by the processing illustrated in FIG. 6.

FIG. 7 is a flowchart illustrating processing of receiving information transmitted by the processing illustrated in FIG. 6.

The server 400 receives information from the data transmission device 100 via the reception unit 401 (step ST401).

The image information accumulating unit 402 in the server 400 stores the received information in the image information storing unit 403. (step ST402)

In the server 400, the processing from step ST401 to step ST402 is periodically repeated.

Figure 8:
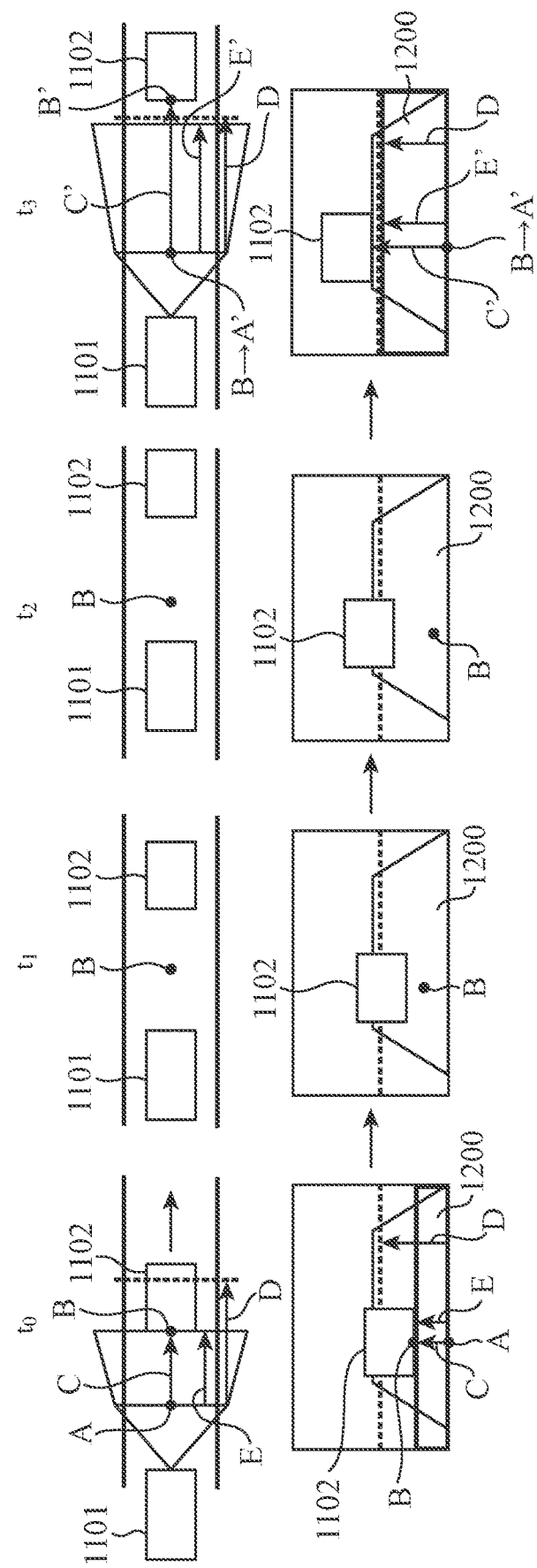
FIG. 8 is a diagram illustrating an example of a concept of processing performed by the data extraction device according to the first embodiment.

FIG. 8 is a diagram illustrating an example of a concept of the processing performed by the data extraction device 110 according to the first embodiment.

FIG. 8 illustrates transition between a situation at the time of imaging (upper diagram) and a captured image (lower diagram) in a case where images are extracted at time to and time $t_3$ during a period from time $t_0$ to time $t_3$.

In FIG. 8, a point A indicates a position (imaging start position) closest to the imaging unit 200 at time $t_0$. A point B indicates a position of an obstruction when a preceding vehicle 1102 is an obstruction at time $t_0$. An arrow C indicates the obstruction distance. An arrow D indicates the first distance. An arrow E indicates the extraction distance.

An image obtained by capturing a region within the obstruction distance C from the point A to the point B at time to is extracted. The point B approaches the host vehicle with the lapse of time of time $t_1$ and time $t_2$, and is turned into a point A' which is the closest point to the imaging unit 200 at time $t_0$. The image and the measurement information at this time are extracted, and the extraction distance (arrow E') based on the position (point B') of the obstruction is calculated from the point A' at time $t_3$ and set as the next extraction distance, whereby the image having no missing section can be extracted.

Figure 9:
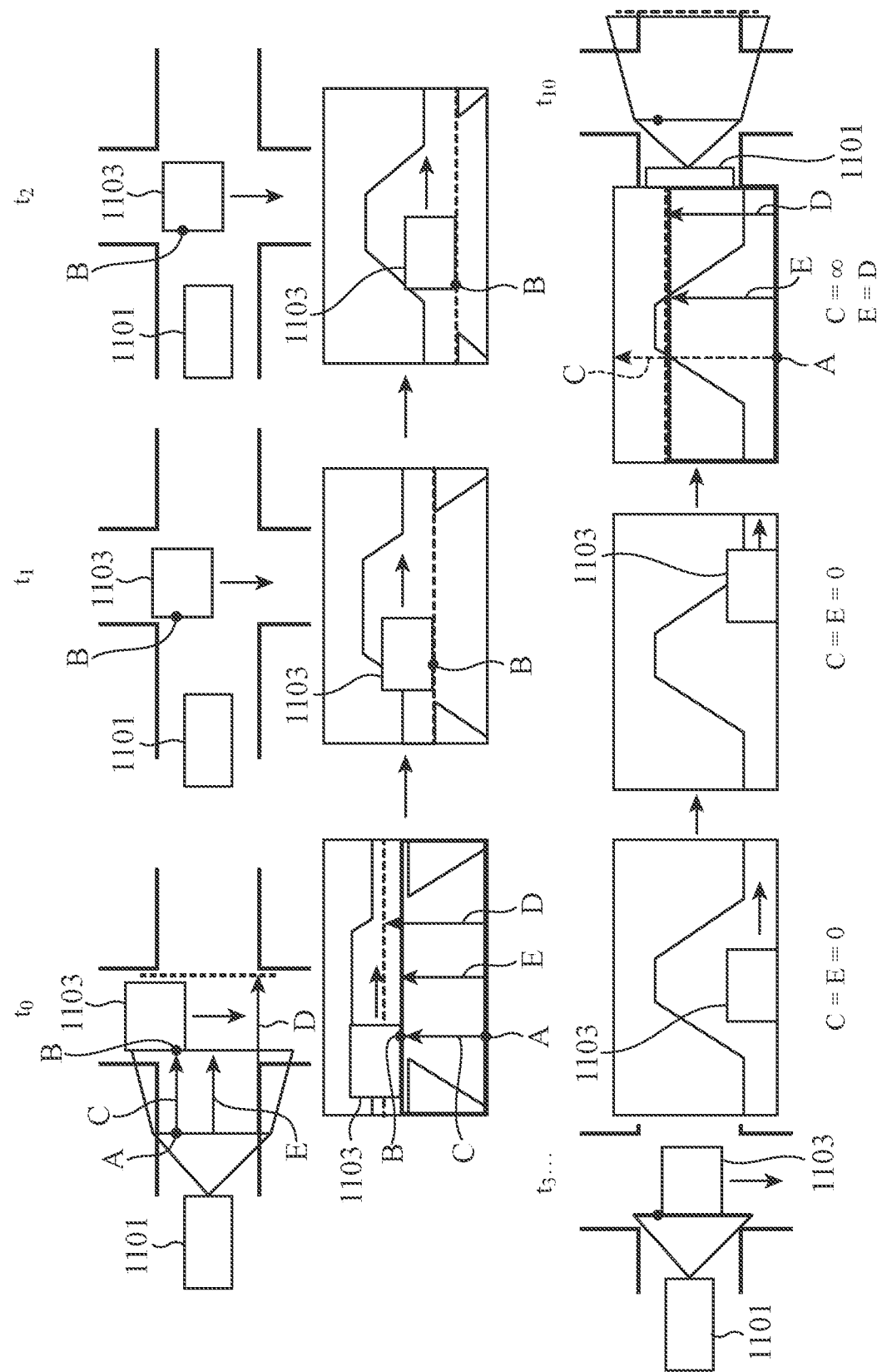
FIG. 9 is a diagram illustrating another example of a concept of processing performed by the data extraction device according to the first embodiment.

FIG. 9 is a diagram illustrating another example of a concept of the processing performed by the data extraction device 110 according to the first embodiment.

FIG. 9 illustrates, for example, a situation in which a preceding vehicle 1103 crosses an intersecting road when the host vehicle 1101 stops at an intersection. In this case, the data extraction device 110 can determine a plurality of images during stop of the host vehicle 1101 as the objects for analysis, calculate the obstruction distance C in each of the objects for analysis, and extract an image having a situation in which the obstruction distance C is the longest (C=∞: no obstruction).

In this way, it is possible to reduce the communication volume as compared with the case where all the captured images are transmitted, and to transmit, to the server 400, an image that includes a road or a structure not covered with any obstruction and that has no missing section.

In addition, regarding the reduction in the communication volume, when an image obtained by extracting only a region up to the obstruction is transmitted, the minimum communication volume to transmit the image without having a missing section or duplication can be achieved, whereby the communication volume can be reduced.

As described above, the data extraction device according to the present disclosure is a data extraction device that extracts an image for transmission from images obtained by capturing surroundings outside a vehicle with an imaging device mounted on the vehicle, each time the vehicle travels an extraction distance, the data extraction device including: an information acquisition unit to acquire an image obtained by capturing surroundings outside the vehicle; an image analysis unit to determine, as an object for analysis, an image captured at a position advanced by the extraction distance from a position at which a previously extracted image has been captured, and calculate an obstruction distance which indicates an actual distance from a position closest to the imaging unit in the image determined as the object for analysis to an obstruction included in the image; an extraction distance determining unit to output the obstruction distance as a next extraction distance; and an image extraction unit to output the image that has been determined as the object for analysis by the image analysis unit.

This configuration provides an effect of providing a data extraction device capable of reducing a communication volume and extracting information in a situation where an obstruction is not present from acquired information.

Further, in the data extraction device according to the present disclosure, the extraction distance determining unit outputs the obstruction distance as the next extraction distance when the obstruction distance is less than the first distance.

This configuration provides an effect of providing a data extraction device that extracts, for example, analyzable information in a situation where no obstruction is present from the acquired information.

In addition, in the data extraction device according to the present disclosure, the extraction distance determining unit further outputs the obstruction distance as the next extraction distance when the obstruction distance is less than a preset first distance, and outputs the first distance as the next extraction distance when the obstruction distance is equal to or greater than the first distance.

This configuration provides an effect of providing a data extraction device that extracts, for example, analyzable information in a situation where no obstruction is present from the acquired information.

Second Embodiment

A data extraction device 110a and a data transmission device 100a according to a second embodiment will be described with reference to FIGS. 10 to 12.

A data transfer system 1a according to the second embodiment is different from the data transfer system 1 according to the first embodiment in that the data extraction device 110 in the data transfer system 1 is replaced with the data extraction device 110a.

The data extraction device 110a is different from the data extraction device 110 in also analyzing the accumulated information at the extraction timing and extracting information.

Figure 10:
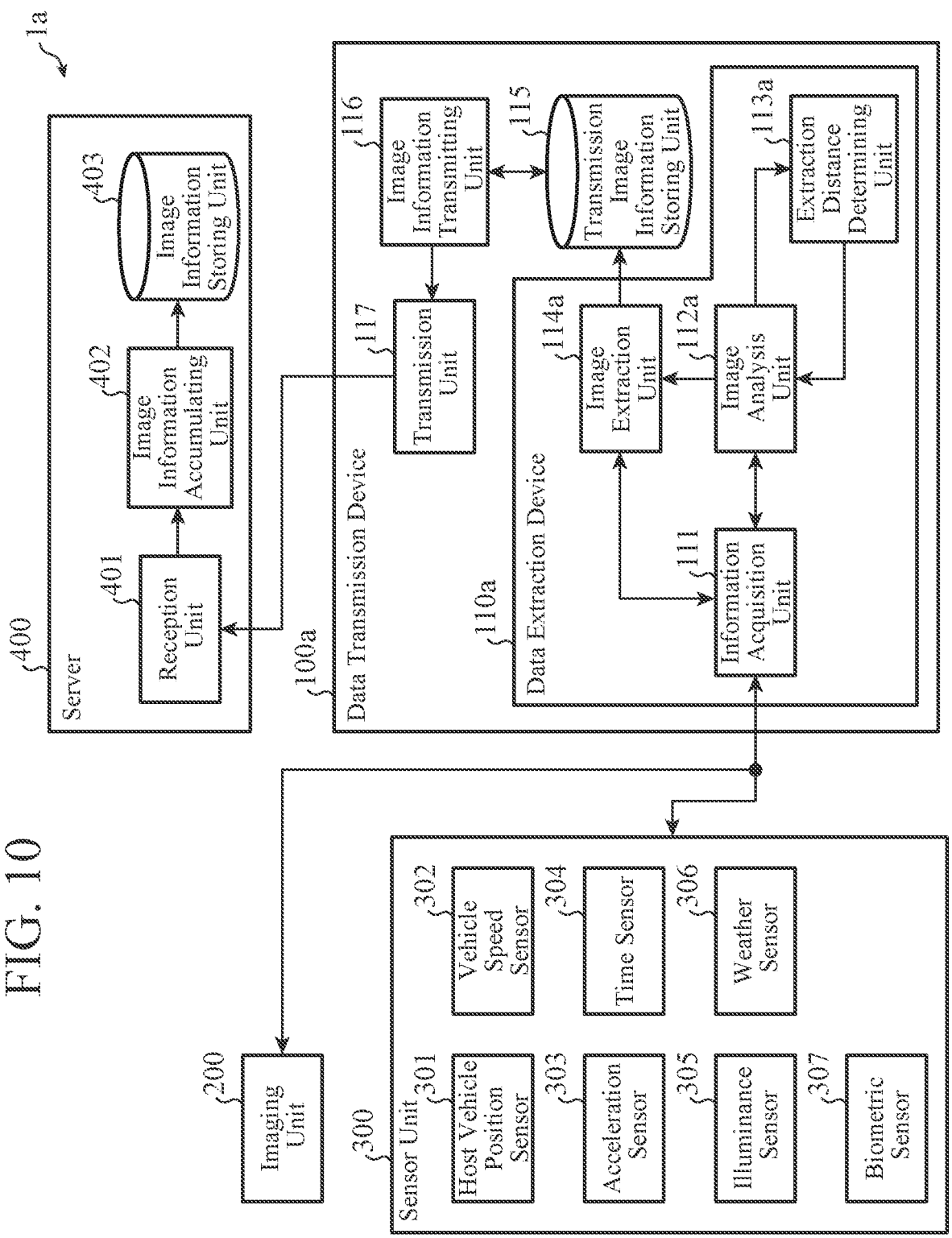
FIG. 10 is a diagram illustrating a configuration of a data extraction device, a data transmission device, and a data transfer system including the data extraction device and the data transmission device according to a second embodiment.

FIG. 10 is a diagram illustrating a configuration of the data extraction device 110a, the data transmission device 100a, and the data transfer system 1a including the data extraction device 110a and the data transmission device 100a according to the second embodiment.

FIG. 11 is a flowchart illustrating processing performed by the data extraction device 110a according to the second embodiment.

Figure 12:
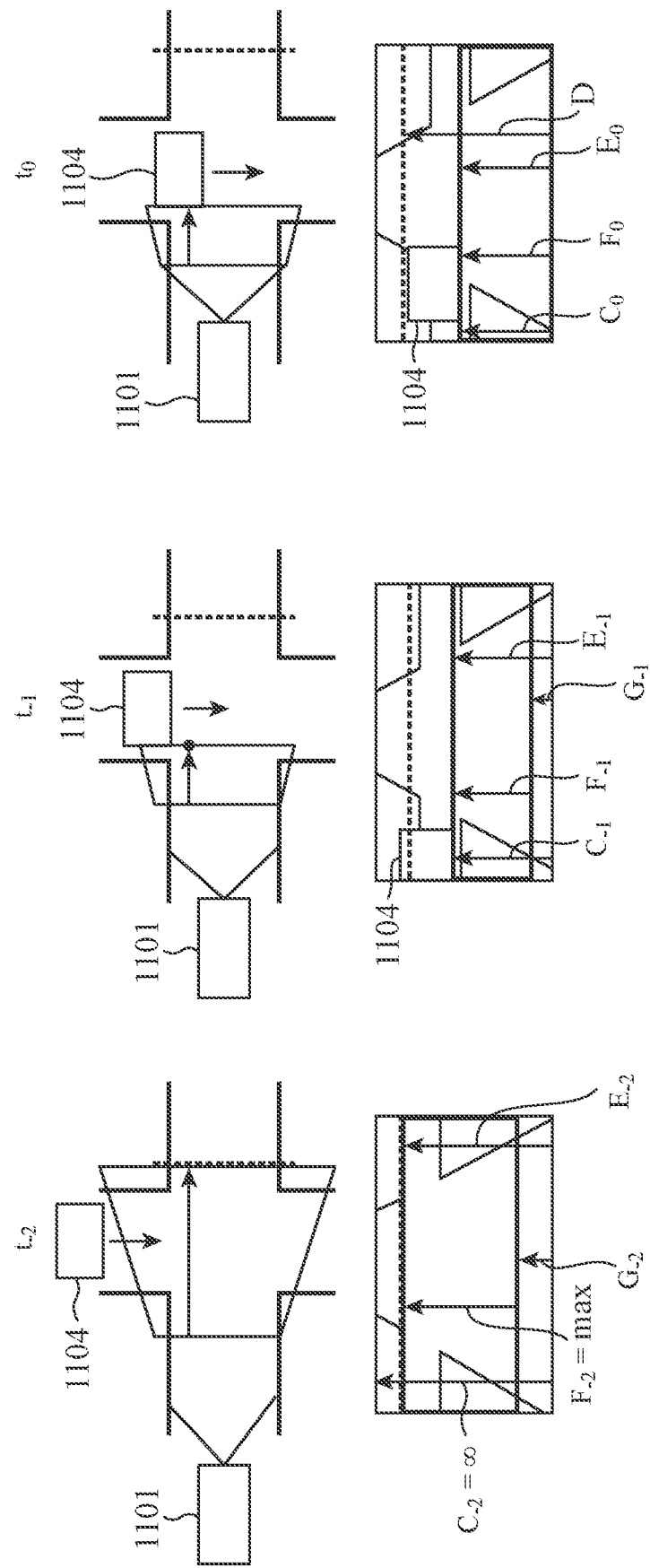
FIG. 12 is a diagram illustrating an example of a concept of the processing performed by the data extraction device according to the second embodiment.

FIG. 12 is a diagram illustrating an example of a concept of the processing performed by the data extraction device 110a according to the second embodiment.

The data extraction device 110a illustrated in FIG. 10 is obtained by replacing the image analysis unit 112, the extraction distance determining unit 113, and the image extraction unit 114 of the data extraction device 110 illustrated in FIG. 1 with an image analysis unit 112a, an extraction distance determining unit 113a, and an image extraction unit 114a.

In the following, points different from the data extraction device 110 illustrated in FIG. 1 will be described, and the description of the same or equivalent contents as those of the data extraction device 110 illustrated in FIG. 1 will be omitted.

In a case where an extraction distance related to an image extracted by the image analysis unit 112a is less than the first distance, the image analysis unit 112a calculates, for each of images acquired by the information acquisition unit during the period from the previous extraction to the current extraction, an obstruction distance from an imaging start position to a closest obstruction in the image and a distance to a position advanced by the extraction distance from an imaging start position in the previously extracted image.

The extraction distance determining unit 113a calculates a calculation distance obtained by subtracting, from the extraction distance, a distance from the imaging start position to a position at the previous extraction distance from the imaging start position in the previous transmission image.

The image extraction unit 114a further extracts an image determined to have the largest calculation distance as a transmission candidate.

A hardware configuration of the data transmission device 100a including the data extraction device 110a according to the second embodiment is different from that of the first embodiment only in a function, and is equivalent to that of the first embodiment. Therefore, the detailed description is omitted.

The processes from step ST201 to step ST209 in FIG. 11 are the same as the processes from step ST201 to step ST209 illustrated in FIG. 5, and thus, the detailed description thereof will be omitted.

When the extraction distance determining unit 113a determines the obstruction distance as the next extraction distance (step ST209) and notifies the image analysis unit 112a, the image analysis unit 112a determines whether or not the determined extraction distance is equal to the first distance (extraction distance=first distance?) (step ST220). This makes it possible to determine whether or not an obstruction is present, from the imaging start position, within the first distance from the image.

In step ST220, if the extraction distance is equal to the first distance ("YES" in step ST220), the processing proceeds to step ST210. Step ST210 is the same as step ST210 illustrated in FIG. 11, and thus, the following description will be omitted.

In step ST220, if the extraction distance is not equal to the first distance ("NO" in step ST220), the image analysis unit 112a determines an object for analysis (step ST221).

In this case, referring to the previous captured images, it is likely that there is an image in which the region not covered by the obstruction is the largest (image captured at time $t_{-2}$) as illustrated in FIG. 12.

Specifically, the image analysis unit 112a acquires, from among the information held by the information acquisition unit 111, images from images previously extracted as transmission candidates to current transmission candidates and a travel distance between images and determines them as objects for analysis.

The image analysis unit 112a repeats the analysis processing for all objects for analysis.

The image analysis unit 112a calculates the obstruction distance and the distance using the extraction distance after the previous transmission (step ST222).

Specifically, the image analysis unit 112a calculates the following items for each image determined as the object for analysis by image recognition. The calculated value is given to the extraction distance determining unit 113a together with information indicating each captured image.

Obstruction distance from the imaging start position to the nearest obstruction

Distance from the imaging start position to a position advanced by the extraction distance from the imaging start position in the previously extracted image The latter corresponds to the travel distance backward from the position where the image determined as the transmission candidate has been captured.

The extraction distance determining unit 113a determines whether or not the obstruction distance is greater than or equal to the first distance (step ST223).

Specifically, the extraction distance determining unit 113a first determines whether or not the obstruction distance is equal to or greater than the first distance (obstruction distance≥first distance?) for each notified image.

When determining that the obstruction distance is greater than or equal to the first distance ("YES" in step ST223), the extraction distance determining unit 113a determines the first distance as the extraction distance (step ST224).

When determining that the obstruction distance is not greater than or equal to the first distance, that is, less than the first distance ("NO" in step ST223), the extraction distance determining unit 113a determines the obstruction distance as the extraction distance (step ST225).

After executing the process of step ST224 or step ST225, the extraction distance determining unit 113a next obtains the calculation distance by calculation.

The extraction distance determining unit 113a calculates a value (value corresponding to an arrow F in FIG. 12) (hereinafter referred to as a calculation distance) obtained by subtracting, from the determined extraction distance (arrow E in FIG. 12), a distance (arrow G in FIG. 12) from the imaging start position to a position advanced by the extraction distance from the imaging start position in the previously extracted image.

When the analysis processing for all the objects for analysis has been completed, the extraction distance determining unit 113a ends the repetitive processing and proceeds to the process of step ST227.

In step ST227, the extraction distance determining unit 113a determines information with a maximum (max) calculation distance (arrow F in FIG. 12) as a transmission candidate, and determines a next extraction distance (step ST228).

Specifically, after calculating the extraction distance and the calculation distance for each of the notified captured images, the extraction distance determining unit 113a redetermines the captured image having the largest calculation distance as the transmission candidate.

The extraction distance determining unit 113a sets the extraction distance of the captured image redetermined as the transmission candidate as the extraction distance for determining the next transmission candidate.

The extraction distance determining unit 113a notifies the image analysis unit 112a of the information indicating the image redetermined as the transmission candidate, the extraction distance, and the calculation distance.

The image analysis unit 112a stores the notified extraction distance in order to determine the next transmission candidate, and notifies the image extraction unit 114a of information indicating the image redetermined as the transmission candidate and the calculation distance.

The image extraction unit 114a stores the information redetermined as a transmission candidate (step ST229).

Specifically, the image extraction unit 114a extracts, from the information acquisition unit 111, the captured image that has been notified from the image analysis unit 112a and has been redetermined as a transmission candidate, and stores the extracted image in the transmission image information storing unit 115 as transmission candidate information.

At this time, only the region within the calculation distance may be extracted and stored as the transmission candidate information. As a result, only a minimum image is transmitted, so that the communication volume can be reduced.

In addition, the image extraction unit 114a also acquires, from the information acquisition unit 111, information acquired from the sensor unit 300 at the time of capturing the image redetermined as the transmission candidate, and add the acquired information to the transmission candidate information.

The above processing is periodically repeated while the image is held by the information acquisition unit 111.

A concept of the above processing will be described. For example, suppose a scene where a preceding vehicle 1104 cuts in from the side as illustrated in FIG. 12. In this case, if there is a captured image before the preceding vehicle 1104 cuts in in images in the past (time $t_{-1}$, time $t_{-2}$), the past captured image (image captured at time $t_{-2}$) has a larger region where the road and structure are not covered by the obstruction than the captured image in which the preceding vehicle 1104 has cut in (obstruction distance $C_{-2}=\infty$). In view of this, the data extraction device 110a determines, as the transmission image, the captured image having the largest region not covered by the obstruction, including the past captured images.

As described above, the image having the largest region not covered by the obstruction including the past captured image can be determined as the transmission candidate.

As described above, in the data extraction device according to the present disclosure, the image analysis unit calculates, for each of images acquired by the information acquisition unit from previous extraction to current extraction, the obstruction distance to a nearest obstruction from the imaging start position in the image and a distance to a position advanced by the extraction distance from the imaging start position in the previously extracted image, when the extraction distance for the image determined as the object for analysis is less than a first distance, the extraction distance determining unit calculates a calculation distance obtained by subtracting, from the extraction distance, a distance from the imaging start position to a position at the previous extraction distance from the imaging start position in a previous transmission image, and determines an image which has been determined to have the largest calculation distance as a transmission candidate, and the image extraction unit extracts the image that has been determined as the transmission candidate by the extraction distance determining unit.

This configuration provides an effect of providing a data extraction device that determines an image having the largest region not covered by an obstruction as a transmission candidate.

Third Embodiment

A third embodiment will describe a mode in which, when an obstruction does not move during traveling of the host vehicle, information is extracted using the next obstruction as an object instead of using the current obstruction as an object.

Figure 13:
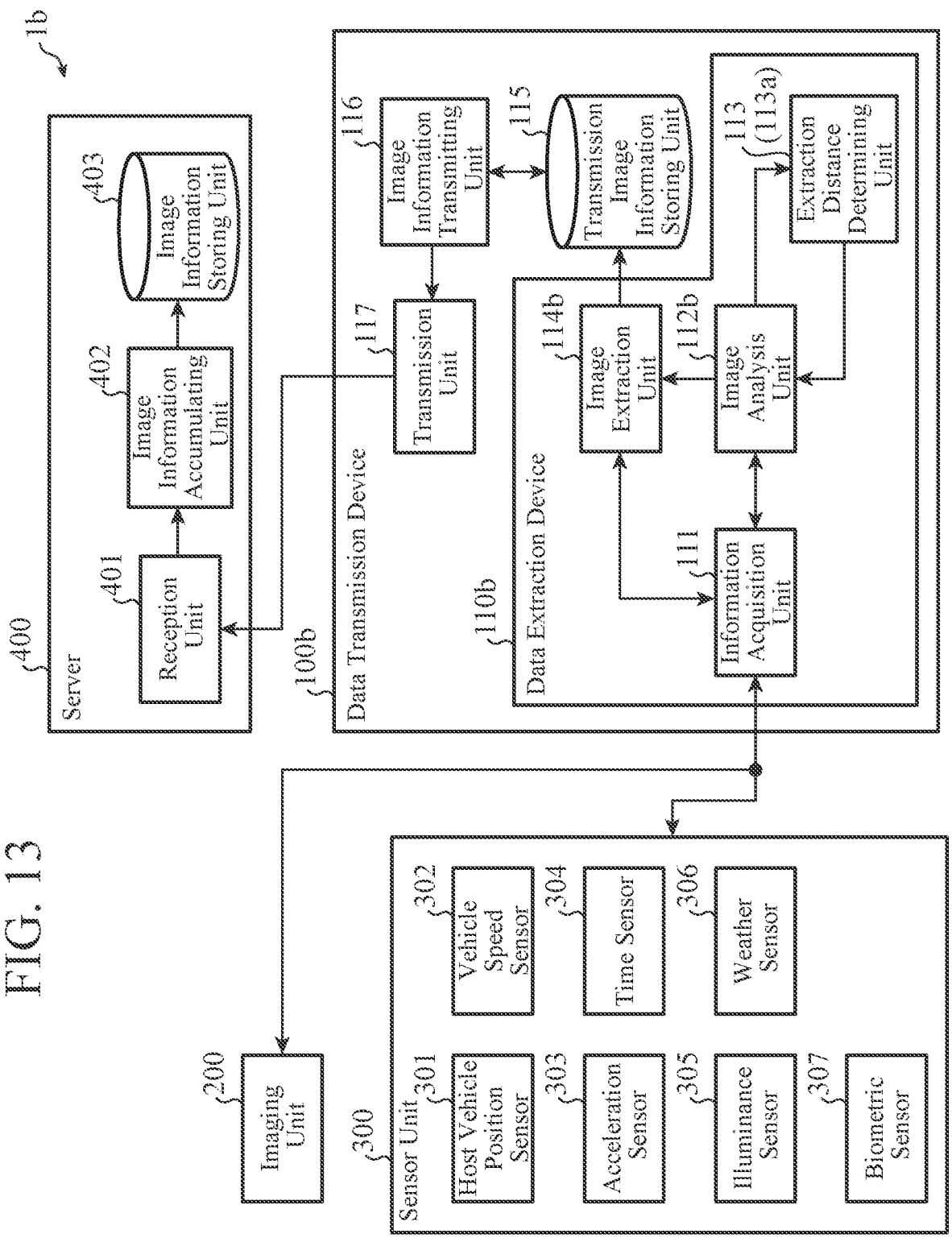
FIG. 13 is a diagram illustrating a configuration of a data extraction device, a data transmission device, and a data transfer system including the data extraction device and the data transmission device according to a third embodiment.

FIG. 13 is a diagram illustrating a configuration of a data extraction device 110b, a data transmission device 100b, and a diagnosis system including the data extraction device 110b and the data transmission device 100b according to the third embodiment.

The data extraction device 110b illustrated in FIG. 13 is obtained by replacing the image analysis unit 112 and the image extraction unit 114 of the data extraction device 110 illustrated in FIG. 1 with an image analysis unit 112b and an image extraction unit 114b.

The data extraction device 110b illustrated in FIG. 13 is obtained by replacing the image analysis unit 112a and the image extraction unit 114a of the data extraction device 110a illustrated in FIG. 10 with the image analysis unit 112b and the image extraction unit 114b.

In the following, points different from the data extraction device 110 illustrated in FIG. 1 and the data extraction device 110a illustrated in FIG. 10 will be described, and the description of the same or equivalent contents as those in FIGS. 1 and 10 will be omitted.

When the extraction distance is zero, the image analysis unit 112b calculates the position information of an obstructed region covered by an obstruction and calculates the obstruction distance for an obstruction next to the above-mentioned obstruction.

The image extraction unit 114b extracts the position information of the obstructed region as a transmission candidate together with the extracted image.

A hardware configuration of the data transmission device 100b including the data extraction device 110b according to the third embodiment is different from that of the first embodiment only in a function, and is equivalent to that of the first embodiment. Therefore, the detailed description is omitted.

Figure 14:
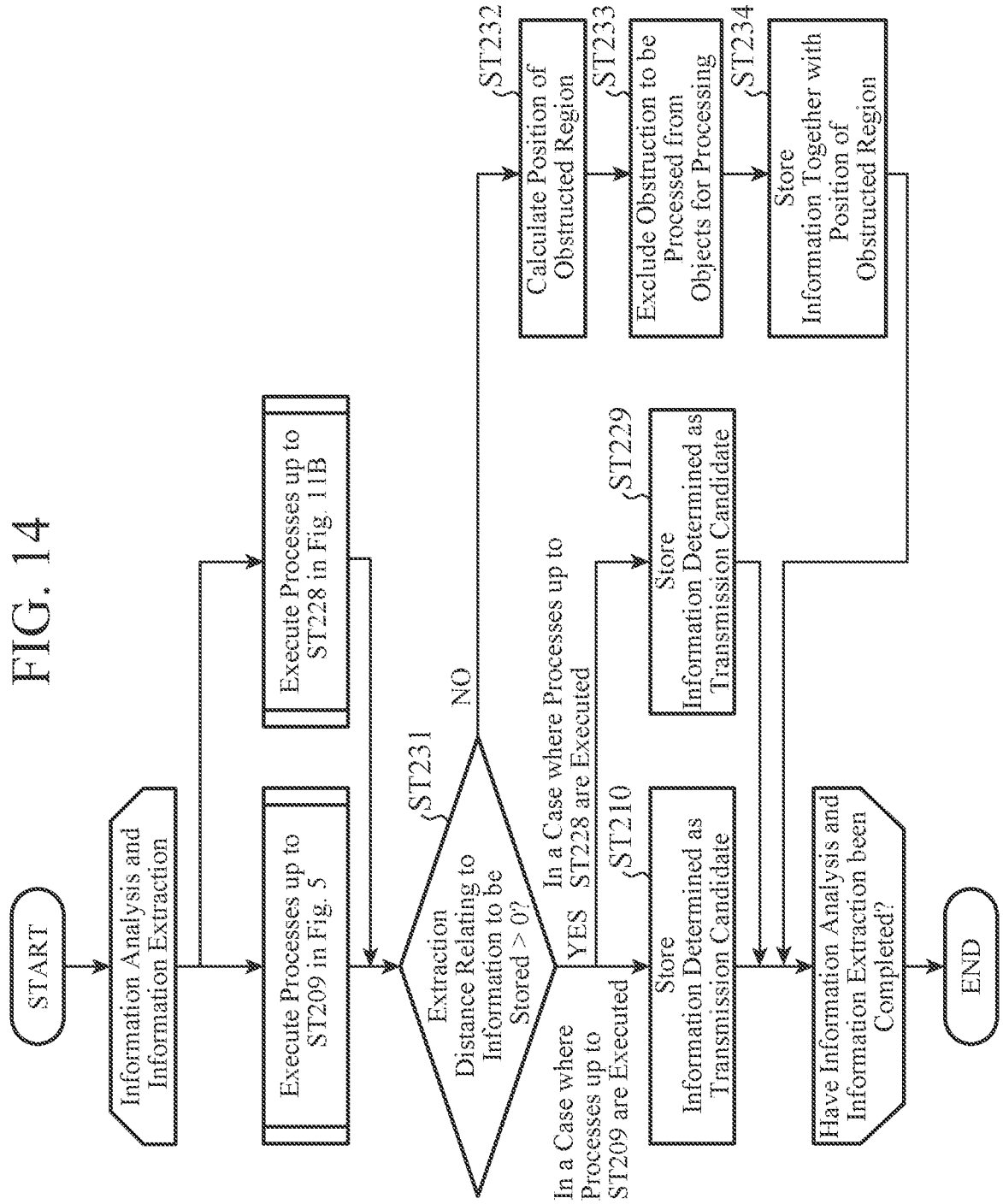
FIG. 14 is a flowchart illustrating processing performed by the data extraction device according to the third embodiment.

FIG. 14 is a flowchart illustrating processing performed by the data extraction device 110b according to the third embodiment.

Figure 15:
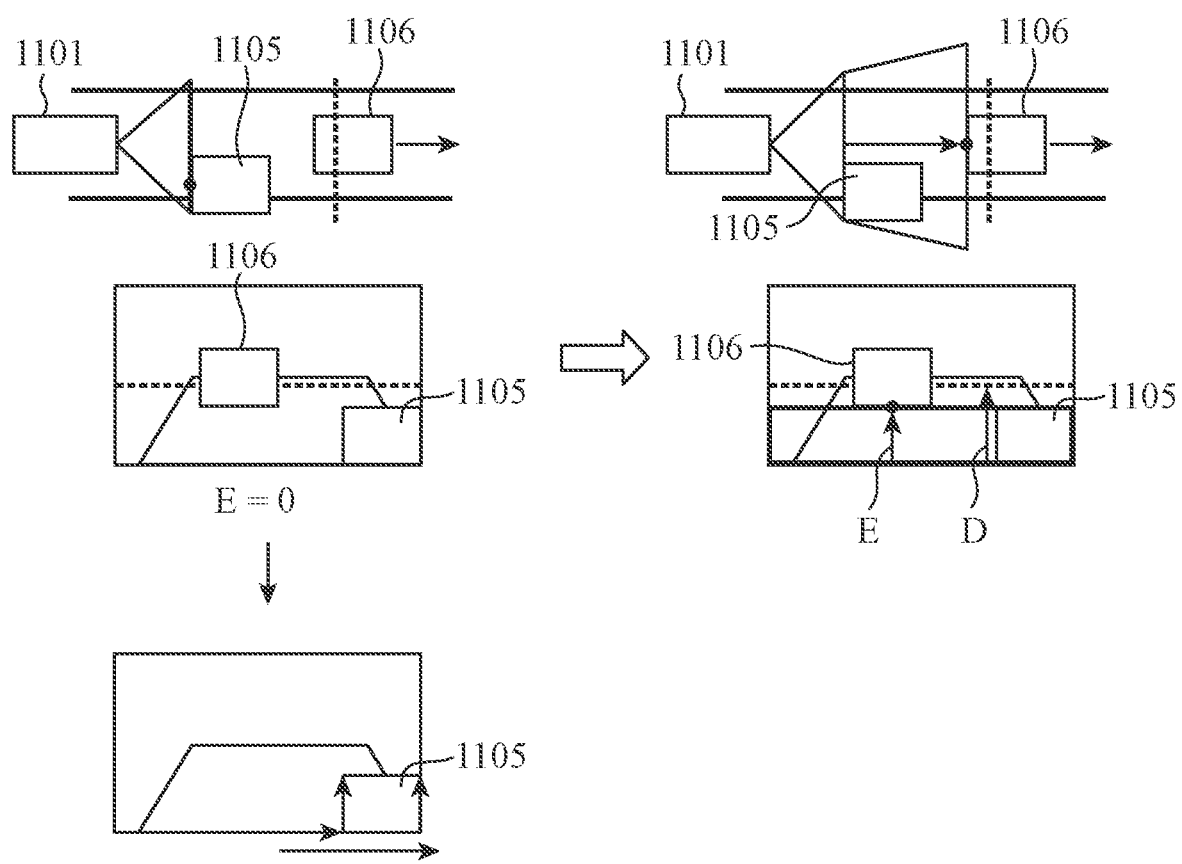
FIG. 15 is a diagram illustrating an example of a concept of the processing performed by the data extraction device according to the third embodiment.

FIG. 15 is a diagram illustrating an example of a concept of the processing performed by the data extraction device 110b according to the third embodiment.

The data extraction device 110b according to the third embodiment is considered to perform processing in which step ST231 is added between step ST209 and step ST210 in FIG. 5 described in the first embodiment and which proceeds from step ST231 to a process (steps ST232, ST233, and ST234) instead of step ST210.

Figure 11A:
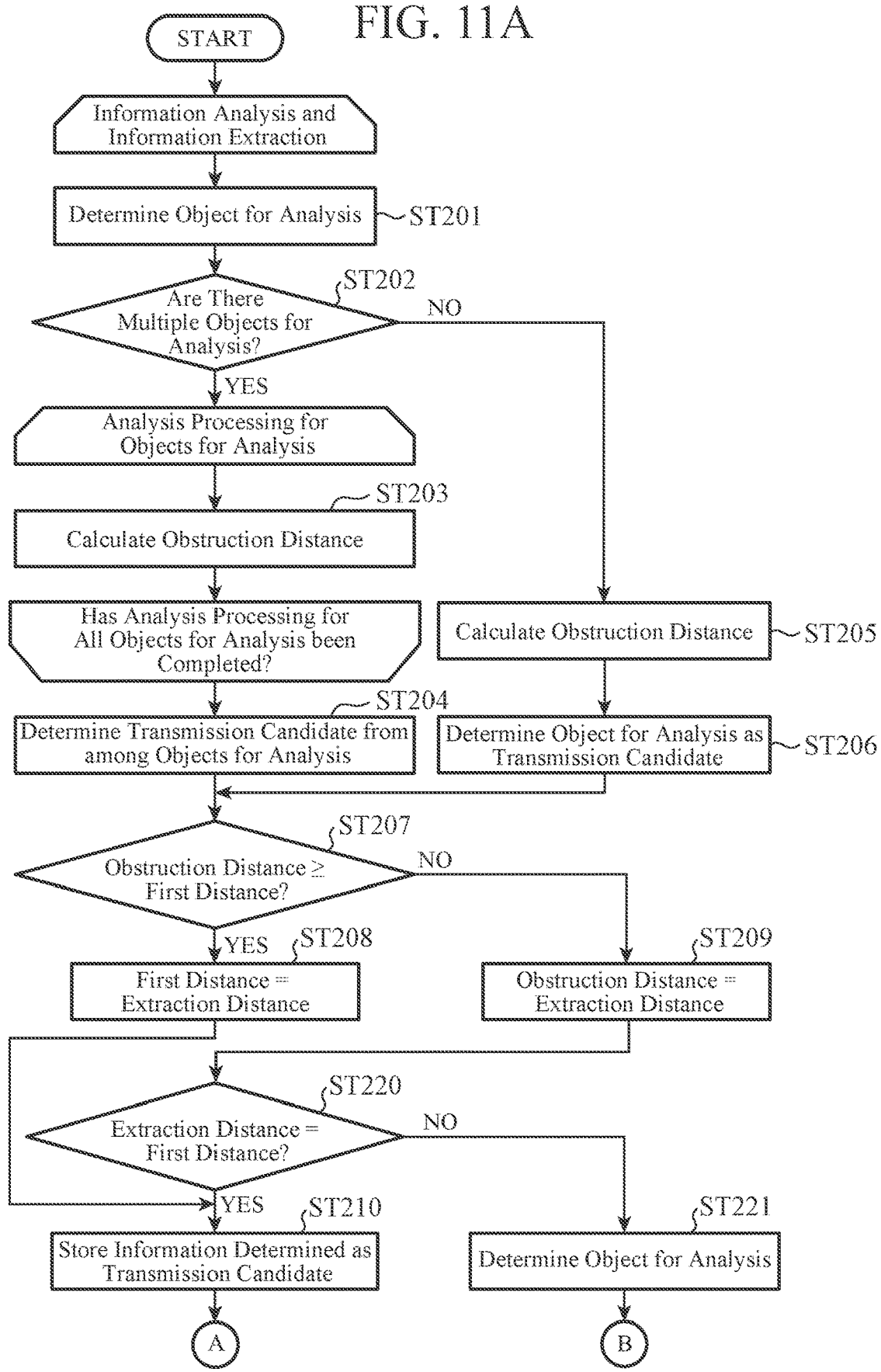
FIG. 11A is a flowchart illustrating processing performed by the data extraction device according to the second embodiment.
Figure 11B:
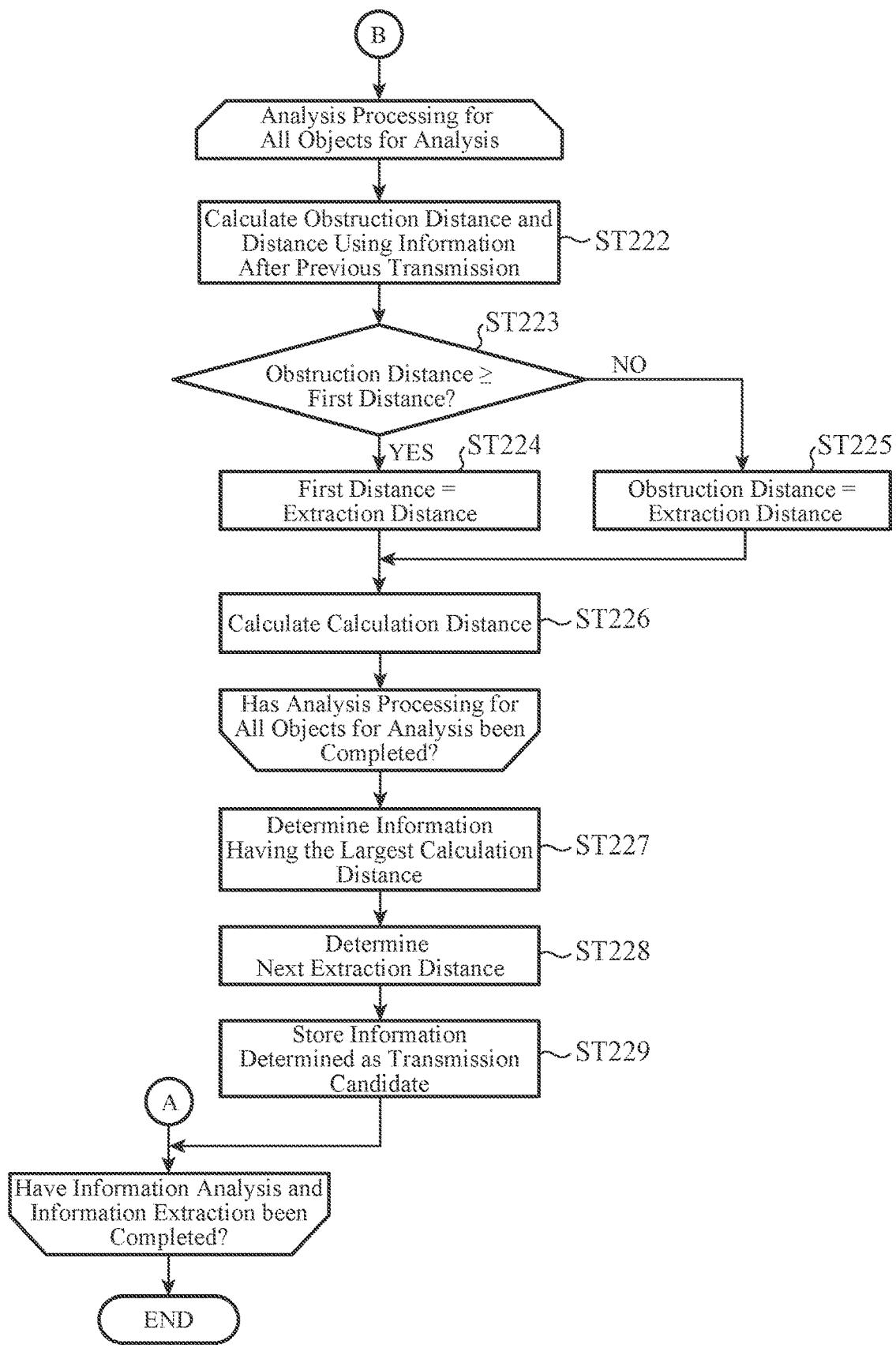
FIG. 11B is a flowchart illustrating processing performed by the data extraction device according to the second embodiment.

Alternatively, the data extraction device 110b according to the third embodiment is considered to perform processing in which step ST231 is added between step ST228 and step ST229 in FIG. 11B described in the second embodiment and which proceeds from step ST231 to a process instead of step ST229.

FIG. 14 does not illustrate the detailed description of the processes same as the processes illustrated in FIG. 5 and the processes illustrated in FIGS. 11A and 11B.

In the following, step ST231, step ST232, step ST233, and step ST234 will be described in detail.

When performing processing equivalent to that performed by the data extraction device 110, the data extraction device 110b executes the processes up to step ST209 illustrated in FIG. 5, and then proceeds to step ST231.

When performing processing equivalent to that performed by the data extraction device 110a, the data extraction device 110b executes the processes up to step ST228, and then proceeds to step ST231.

In step ST231, it is determined whether or not the extraction distance relating to information to be stored is greater than zero.

Specifically, the image analysis unit 112b determines whether or not the extraction distance in the transmission candidate image received from the extraction distance determining unit 113 (or extraction distance determining unit 113a) is greater than zero.

If the image analysis unit 112b determines that the extraction distance is greater than zero ("YES" in step ST231), there is a region that is not covered with the obstruction in the imaging direction from the imaging start position, and thus, there is no need to notify a re-examination region, and the processing proceeds to step ST210 illustrated in FIG. 5 or step ST229 illustrated in FIG. 11B.

When determining in step ST231 that the extraction distance regarding the information to be stored is zero ("NO" in step ST231), the image analysis unit 112b calculates the position of the obstructed region by the obstruction (step ST232).

When the extraction distance is zero (extraction distance E=0), the obstruction (stopped vehicle 1105 in FIG. 15) is present at the same position as the imaging start position, and there is no captured image in which the region covered by the obstruction can be seen, as illustrated in FIG. 15. That is, during the current traveling, the region which is not covered with the obstruction cannot be seen in the captured image, which indicates that the region needs to be reexamined at some time.

The image analysis unit 112b calculates the position of the obstructed region covered by the nearest obstruction from the imaging start position in the transmission candidate image by image recognition.

If the moving distance in the image from the center of the imaging start point to the vertex of the obstruction is known, the range of the obstructed region can be calculated from the correlation information with the actual distance and the position of the host vehicle. (See the lowermost diagram in FIG. 15.)

The image analysis unit 112b excludes the obstruction currently determined to be processed (the stopped vehicle 1105 in FIG. 15) from objects to be processed (step ST233).

Specifically, at the time of the next processing, the image analysis unit 112b ignores the corresponding obstruction and determines to perform processing on the second nearest obstruction.

In addition, the image analysis unit 112b notifies the image extraction unit 114b of the information indicating the transmission candidate image and the position information of the obstructed region.

The image extraction unit 114b stores the position of the obstructed region together with the information (step ST234).

Specifically, the image extraction unit 114b extracts, from the information acquisition unit 111, the captured image that has been notified and has been determined as a transmission candidate, and stores the extracted image in the transmission image information storing unit 115 as transmission candidate information together with the position information of the obstructed region.

During this process, the image extraction unit 114b may also acquire, from the information acquisition unit 111, information acquired from the sensor unit 300 at the time of capturing the image determined as the transmission candidate, and add the acquired information to the transmission candidate information.

Alternatively, only the position information of the obstructed region may be used without using the image determined as the transmission candidate.

The above processing is periodically repeated while the previous transmission image is held by the information acquisition unit 111.

As described above, in a case where there is no image that is not covered by an obstruction even by performing the first embodiment or the second embodiment, it is possible to report the region covered by the obstruction as a region to be reexamined.

As described above, in the data extraction device according to the present disclosure, the image analysis unit calculates position information of the obstructed region covered by the obstruction and calculates the obstruction distance for an obstruction next to the obstruction, w % ben the extraction distance is zero, and the image extraction unit extracts the position information of the obstructed region as a transmission candidate.

As a result, it is possible to provide a data extraction device that extracts information notifying a region covered by an obstruction as a region to be reexamined.

Fourth Embodiment

A fourth embodiment will describe a mode in which a notification prompting to increase the inter-vehicular distance is given in order to enable extraction of necessary information. A data extraction device 110c according to the fourth embodiment aims to reduce a transmission load by keeping a third distance or more as the distance between the host vehicle and the preceding vehicle, when the extraction distance is less than a predetermined second distance as a result of execution of the first embodiment, the second embodiment, or the third embodiment.

Figure 16:
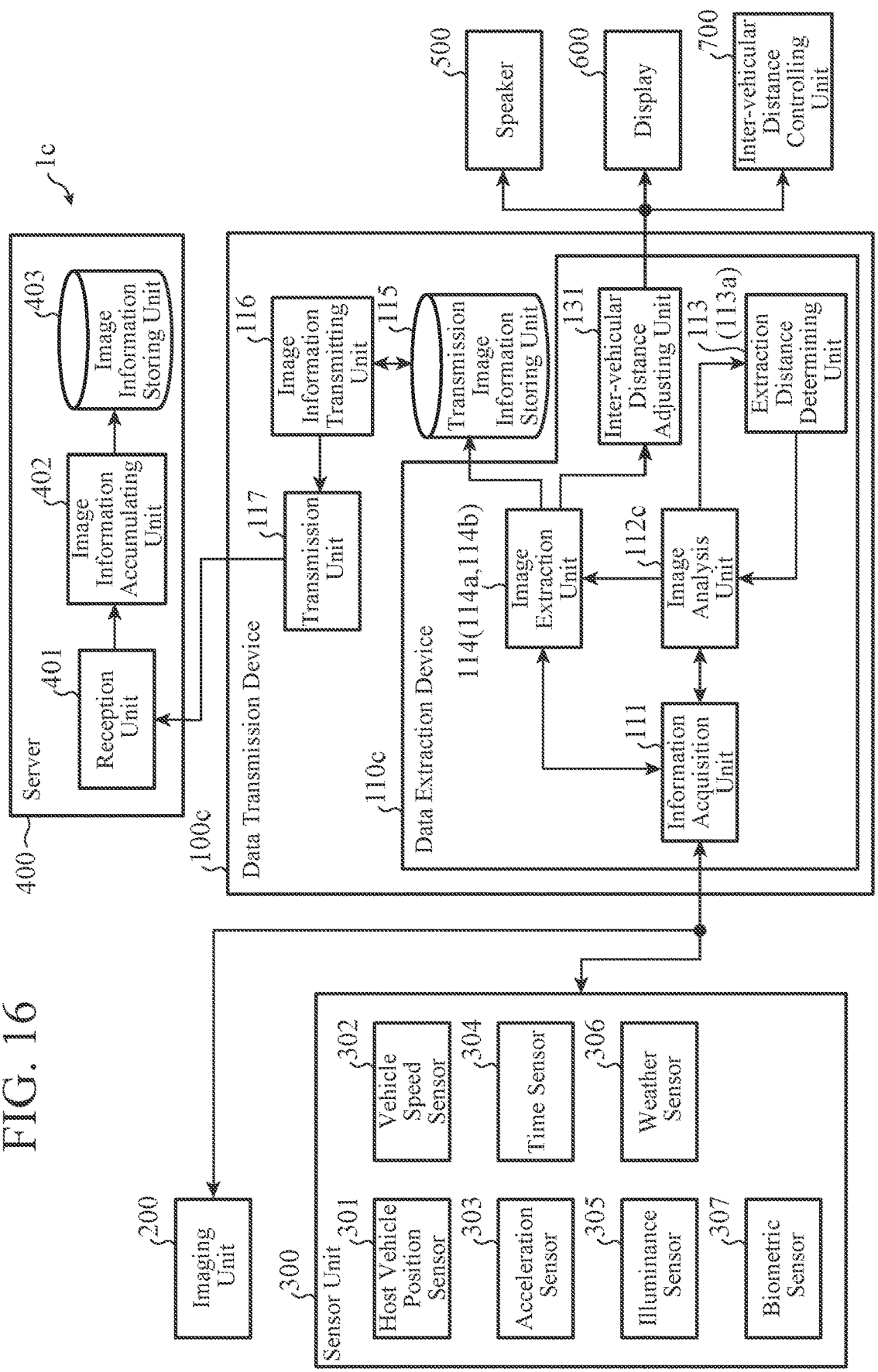
FIG. 16 is a diagram illustrating a configuration of a data extraction device, a data transmission device, and a diagnosis system including the data extraction device and the data transmission device according to a fourth embodiment.

FIG. 16 is a diagram illustrating a configuration of a data extraction device 110c, a data transmission device 100c, and a diagnosis system including the data extraction device 110c and the data transmission device 100c according to the fourth embodiment.

Figure 17:
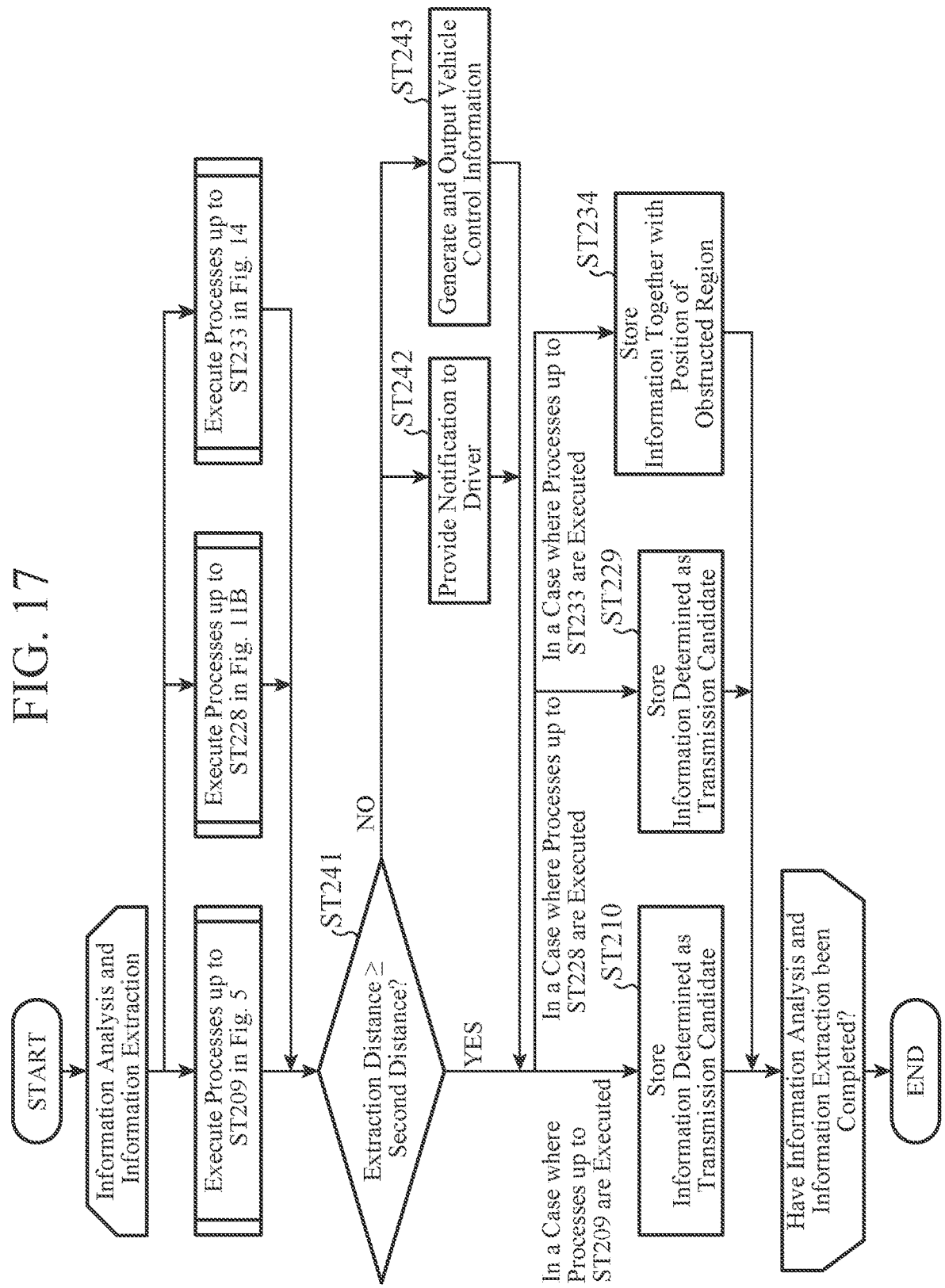
FIG. 17 is a flowchart illustrating processing performed by the data extraction device according to the fourth embodiment.

FIG. 17 is a flowchart illustrating processing performed by the data extraction device 110c according to the fourth embodiment.

Figure 18:
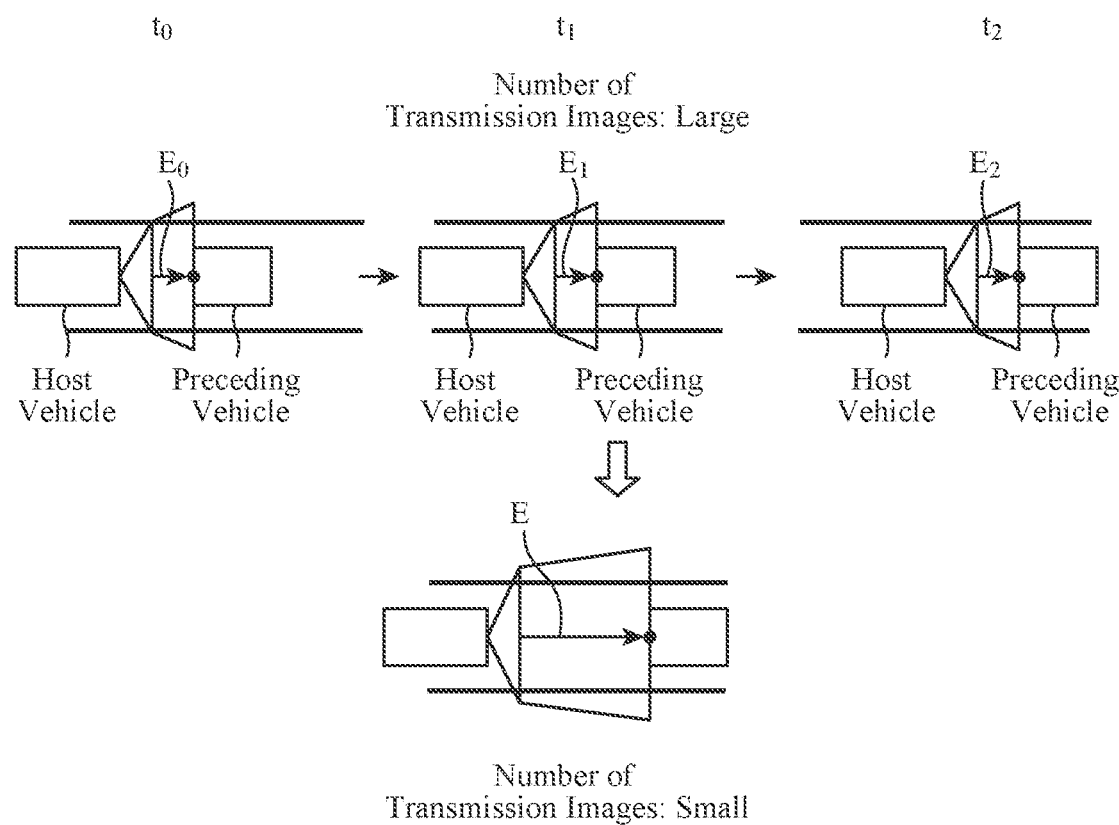
FIG. 18 is a diagram illustrating an example of a concept of the processing performed by the data extraction device according to the fourth embodiment.

FIG. 18 is a diagram illustrating an example of a concept of the processing performed by the data extraction device 110c according to the fourth embodiment.

The data extraction device 110c illustrated in FIG. 16 is obtained by replacing the image analysis unit 112 of the data extraction device 110 illustrated in FIG. 1 with an image analysis unit 112c. In addition, an inter-vehicular distance adjusting unit 131 is further provided.

The data extraction device 110c illustrated in FIG. 16 is obtained by replacing the image analysis unit 112a of the data extraction device 110a illustrated in FIG. 10 with the image analysis unit 112c. In addition, the inter-vehicular distance adjusting unit 131 is further provided.

The data extraction device 110c illustrated in FIG. 16 is obtained by replacing the image analysis unit 112b of the data extraction device 110b illustrated in FIG. 13 with the image analysis unit 112c. In addition, the inter-vehicular distance adjusting unit 131 is further provided.

In the following, points different from the data extraction device 110 illustrated in FIG. 1, the data extraction device 110a illustrated in FIG. 10, and the data extraction device 110b illustrated in FIG. 13 will be described, and the description of the same or equivalent contents as those in FIG. 1, 10, or 13 will be omitted.

The data extraction device 110c further includes the inter-vehicular distance adjusting unit 131.

When the extraction distance is less than the second distance, the inter-vehicular distance adjusting unit 131 issues a notification to keep the third distance or more as the inter-vehicular distance between the vehicle and the preceding vehicle, or issues a control instruction to keep the third distance or more as the inter-vehicular distance.

The second distance is a distance that reduces the number of transmission images, and is, for example, equal to or less than the first distance, as illustrated in FIG. 18.

Similar to the second distance, the third distance is a distance that reduces the number of transmission images, and is, for example, equal to or greater than the first distance.

The inter-vehicular distance adjusting unit 131 is connected to an external notification device and an inter-vehicular distance controlling unit 700 in auto cruise control (ACC).

Specifically, the external notification device is at least one of a voice output device such as a speaker 500 or a display device such as a display 600.

A hardware configuration of the data transmission device 100c including the data extraction device 110c according to the fourth embodiment is obtained by adding a function of the inter-vehicular distance adjusting unit 131 to the functions of the components equivalent to the components described in the first embodiment, and is equivalent to that of the first embodiment. Therefore, the detailed description is omitted.

A concept of processing performed by the data extraction device 110c according to the fourth embodiment will be described.

As illustrated in FIG. 18, the number of images to be transmitted to the server 400 is larger when the extraction distance is small than when the extraction distance is great. Therefore, in a case where the extraction distance is smaller than a certain distance (second distance), the number of images to be transmitted to the server 400 is reduced by issuing a notification or controlling the host vehicle to keep a wide inter-vehicular distance, to thereby reduce the transmission load.

The processing performed by the data extraction device 110c according to the fourth embodiment will be described.

The data extraction device 110c according to the fourth embodiment is considered to perform processing in which steps ST241 to ST243 are added between step ST209 and step ST210 in FIG. 5 described in the first embodiment.

Alternatively, the data extraction device 110c according to the fourth embodiment is considered to perform processing in which steps ST241 to ST243 are added between step ST228 and step ST229 in FIG. 11B described in the second embodiment.

Alternatively, the data extraction device 110c according to the fourth embodiment is considered to perform processing in which steps ST241 to ST243 are added between step ST233 and step ST234 in FIG. 14 described in the third embodiment.

FIG. 17 does not illustrate the detailed description of the processes same as the processes illustrated in FIG. 5, the processes illustrated in FIGS. 11A and 11B, and the processes illustrated in FIG. 14.

In the following, step ST241, step ST242, and step ST243 will be described in detail.

The image analysis unit 112c determines whether or not the extraction distance is equal to or greater than the second distance (step ST241).

When the extraction distance is equal to or greater than the second distance ("YES" in step ST241), the processing proceeds to step ST210, step ST229, or step ST234.

The case where the extraction distance is less than the second distance indicates that the inter-vehicular distance is relatively small when the obstruction is the preceding vehicle. Therefore, when the extraction distance is less than the second distance ("NO" in step ST241), the image analysis unit 112c instructs the inter-vehicular distance adjusting unit to keep a certain amount or more as the inter-vehicular distance from the preceding vehicle.

Upon receiving the instruction from the image analysis unit 112c, the inter-vehicular distance adjusting unit 131 notifies a driver of the instruction (step ST242), and generates and outputs vehicle control information (step ST243).

Specifically, the inter-vehicular distance adjusting unit 131 gives, to the driver, a notification instructing to keep the third distance or more as the distance between the host vehicle and the preceding vehicle using the speaker 500 or the display 600.

Alternatively, the inter-vehicular distance adjusting unit controls the host vehicle using the inter-vehicular distance controlling unit 700 such as the ACC control function in such a way that the preset third distance or more is kept as the distance between the host vehicle and the preceding vehicle.

Here, the distance between the host vehicle and the preceding vehicle is only adjusted. Therefore, if the obstruction is not the preceding vehicle, the distance to the obstruction is not adjusted even when the extraction distance is less than the second distance. Thus, the inter-vehicular distance is not set for a pedestrian, a light vehicle, a stopped vehicle, or the like.

When the processes of step ST242 and step ST243 end, the processing proceeds to the process of step ST210, step ST229, or step ST234.

Note that, regarding the data extraction device 110c according to the fourth embodiment, a certain distance or more is kept for only the preceding vehicle. Note that, since the host vehicle often overtakes a pedestrian, a light vehicle, a stopped vehicle, or the like, the type of the obstruction may be detected, and whether or not a certain distance is kept as the inter-vehicular distance may be determined depending on the type of the obstruction.

The above processing is periodically repeated while the previously extracted image is held by the information acquisition unit 111.

As described above, the inter-vehicular distance from the preceding vehicle is controlled to be a certain distance or more, whereby the transmission load can be reduced.

As described above, the data extraction device according to the present disclosure includes the inter-vehicular distance adjusting unit that gives a notification instructing to keep the third distance or more as the inter-vehicular distance between the vehicle and the preceding vehicle ahead of the vehicle or issue a control instruction to keep the third distance or more as the inter-vehicular distance, when the extraction distance is less than the second distance.

With this configuration, information acquired in a state where a certain distance or more is kept as the inter-vehicular distance from the preceding vehicle is transmitted, whereby the number of times of transmission is reduced. Thus, an effect of being capable of reducing the transmission load can be provided. Furthermore, as the number of times of transmission is reduced, the communication volume is also reduced.

It is to be noted that, in the present disclosure, two or more of the above embodiments can be freely combined, or any component in the embodiments can be modified or omitted, within the scope of the present disclosure.

INDUSTRIAL APPLICABILITY

In the data extraction device according to the present disclosure, an extraction distance for extracting information for transmission changes depending on a distance from the vehicle to an obstruction. Thus, the data extraction device is suitable for use in a data transmission device or the like that extracts information for transmission from information acquired by a device mounted on a vehicle and transmits the information for transmission.

In addition, the data extraction device according to the present disclosure is suitable for use in a diagnosis system or the like that diagnoses a state of a road and a structure using an image acquired by a device mounted on a vehicle.

REFERENCE SIGNS LIST 1, 1a, 1b, 1c: data transfer system, 100, 100a. 100b, 100c: data transmission device, 110, 110a, 110b, 110c: data extraction device, 111: information acquisition unit, 112, 112a. 112b 112c: image analysis unit, 113, 113a: extraction distance determining unit, 114, 114a, 114b: image extraction unit, 115: transmission image information storing unit, 116: image information transmitting unit, 117: transmission unit, 131: inter-vehicular distance adjusting unit, 200: imaging unit, 300: sensor unit, 301: host vehicle position sensor. 302: vehicle speed sensor, 303: acceleration sensor, 304: time sensor. 305: illuminance sensor, 306: weather sensor, 307: biometric sensor, 400: server, 401: reception unit, 402: image information accumulating unit, 403: image information storing unit, 500: speaker, 600: display, 700: inter-vehicular distance controlling unit, 1001: processor, 1002: first memory, 1003: second memory, 1004: transmitter, 1005: processing circuit. 1101: host vehicle, 1102, 1103, 1104, 1106: preceding vehicle, 1105: stopped vehicle, 1200: road

The invention claimed is:

1. A data extraction device that extracts an image for transmission from images obtained by capturing surroundings outside a vehicle with an imaging device mounted on the vehicle, each time the vehicle travels an extraction distance, the data extraction device comprising:
processing circuitry configured to
acquire an image obtained by capturing the surroundings outside the vehicle;
determine, as an object to be analyzed, an image captured at a position advanced by the extraction distance from a position at which a previously extracted image has been captured, and calculate an obstruction distance which indicates an actual distance from an imaging start position of the image having been determined as the object to be analyzed to a position of an obstruction included in the determined image;
output the calculated obstruction distance as a next extraction distance for obtaining a next image by capturing surroundings outside the vehicle with the imaging device mounted on the vehicle; and
extract the image that has been determined as the object to be analyzed.

2. The data extraction device according to claim 1, wherein the processing circuitry outputs the obstruction distance as the next extraction distance, when the obstruction distance is less than a first distance.

3. The data extraction device according to claim 1, wherein the processing circuitry outputs the obstruction distance as the next extraction distance, when the obstruction distance is less than a first distance, and outputs the first distance as the next extraction distance, when the obstruction distance is equal to or greater than the first distance.

4. The data extraction device according to claim 1, wherein
the processing circuitry calculates, for each of images having been acquired from previous extraction to current extraction, the obstruction distance to a nearest obstruction from the imaging start position in the image and a distance to a position advanced by the extraction distance from the imaging start position in the previously extracted image, when the extraction distance regarding the image having been determined as the object to be analyzed is less than a first distance,
the processing circuitry calculates a calculation distance obtained by subtracting, from the extraction distance, a distance from the imaging start position to a position advanced by the previous extraction distance from the imaging start position in a previous transmission image, and determines an image which has been determined to have a largest calculation distance as a transmission candidate, and
the processing circuitry extracts the image that has been determined as the transmission candidate.

5. The data extraction device according to claim 1, wherein
the processing circuitry calculates position information of an obstructed region covered by the obstruction and calculates the obstruction distance for an obstruction to be targeted next to the obstruction, when the extraction distance is zero, and
the processing circuitry extracts the position information of the obstructed region as a transmission candidate.

6. The data extraction device according to claim 1, wherein the processing circuitry is further configured to provide a notification to keep a third distance or more as an inter-vehicular distance between the vehicle and a preceding vehicle or issue a control instruction to keep the third distance or more as the inter-vehicular distance, when the extraction distance is less than a second distance.

7. A data extraction method for extracting an image for transmission from images obtained by capturing surroundings outside a vehicle with an imaging device mounted on the vehicle, each time the vehicle travels an extraction distance, the data extraction method comprising:
acquiring an image obtained by capturing the surroundings outside the vehicle;
determining, as an object to be analyzed, an image captured at a position advanced by the extraction distance from a position at which a previously extracted image has been captured, and calculating an obstruction distance which indicates an actual distance from an imaging start position of the image having been determined as the object to be analyzed to a position of an obstruction included in the determined image;
outputting the calculated obstruction distance as a next extraction distance for obtaining a next image by capturing surroundings outside the vehicle with the imaging device mounted on the vehicle; and
extracting the image that has been determined as the object to be analyzed.

8. A data transmission device that extracts an image for transmission from images obtained by capturing surroundings outside a vehicle with an imaging device mounted on the vehicle, each time the vehicle travels an extraction distance, and transmits the extracted image to an outside of the vehicle, the data transmission device comprising:
processing circuitry configured to
acquire an image obtained by capturing the surroundings outside the vehicle;
determine, as an object to be analyzed, an image captured at a position advanced by the extraction distance from a position at which a previously extracted image has been captured, and calculate an obstruction distance which indicates an actual distance from an imaging start position of the image having been determined as the object to be analyzed to a position of an obstruction included in the determined image;
output the calculated obstruction distance as a next extraction distance for obtaining a next image by capturing surroundings outside the vehicle with the imaging device mounted on the vehicle;
extract the image that has been determined as the object to be analyzed; and
transmit the extracted image.

* * * * *